US011695491B2

(12) United States Patent
Wang et al.

(10) Patent No.: US 11,695,491 B2
(45) Date of Patent: *Jul. 4, 2023

(54) 5G SYSTEM SUPPORT FOR CONVEYING TSN TIME SYNCHRONIZATION

(71) Applicant: Telefonaktiebolaget LM Ericsson (publ), Stockholm (SE)

(72) Inventors: Kun Wang, Solna (SE); John Walter Diachina, Garner, NC (US); Anders Höglund, Hägersten (SE); Dinand Roeland, Sollentuna (SE); Stefano Ruffini, Rome (IT); Magnus Sandgren, Staffanstorp (SE); Mårten Wahlström, Hägersten (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/841,130

(22) Filed: Jun. 15, 2022

(65) Prior Publication Data

US 2022/0311533 A1    Sep. 29, 2022

Related U.S. Application Data

(63) Continuation of application No. 17/295,319, filed as application No. PCT/IB2019/059950 on Nov. 19, 2019, now Pat. No. 11,405,122.

(Continued)

(51) Int. Cl.
*H04J 3/06* (2006.01)
*H04L 12/46* (2006.01)
(Continued)

(52) U.S. Cl.
CPC ......... *H04J 3/0667* (2013.01); *H04J 3/0644* (2013.01); *H04W 56/001* (2013.01); *H04W 76/12* (2018.02)

(58) Field of Classification Search
CPC ...... H04J 3/0635; H04J 3/0644; H04J 3/0667; H04L 67/12; H04L 69/28; H04W 56/001; H04W 76/12
See application file for complete search history.

(56) References Cited

U.S. PATENT DOCUMENTS

2011/0216816 A1   9/2011  Frenzel
2016/0112182 A1   4/2016  Karnes
(Continued)

FOREIGN PATENT DOCUMENTS

| CN | 102195768 A | 9/2011 |
| CN | 102447552 A | 5/2012 |
| WO | 2020111994 A1 | 6/2020 |

OTHER PUBLICATIONS

Author Unknown, "Technical Specification Group Services and System Aspects; Study on Communication for Automation in Vertical Domains (Release 16)," Technical Report 22.804, Version 16.1.0, 3GPP Organizational Partners, Sep. 2018, 189 pages.

(Continued)

*Primary Examiner* — Alpus Hsu
(74) *Attorney, Agent, or Firm* — Withrow & Terranova, PLLC

(57) ABSTRACT

Systems and methods to enable 5G system support for conveying time synchronization are provided. In some embodiments, a method performed by a wireless device for conveying external time domain information is provided. The method includes receiving a message in a first time domain used by the wireless device, the message comprising external time domain information; determining information about a second time domain based on the external time domain information; and conveying information about the second time domain to another node. In some embodiments, timing information is included into a GPRS Tunneling Protocol (GTP) payload, and the wireless device can get (Continued)

timing information directly from the data payload. This minimizes the RAN and/or gNB impact and adds the potential for multiple time domain support.

15 Claims, 19 Drawing Sheets

Related U.S. Application Data

(60) Provisional application No. 62/769,390, filed on Nov. 19, 2018.

(51) Int. Cl.
*H04W 56/00* (2009.01)
*H04W 76/12* (2018.01)

(56) References Cited

U.S. PATENT DOCUMENTS

2017/0237512 A1    8/2017    Galea et al.
2018/0309655 A1    10/2018    Joseph et al.

OTHER PUBLICATIONS

Author Unknown, "Technical Specification Group Services and System Aspects; Study on 5GS Enhanced support of Vertical and LAN Services (Release 16)," Technical Report 23.734, Version 0.3.0, 3GPP Organizational Partners, Oct. 2018, 97 pages.
Author Unknown, "Technical Specification Group Services and System Aspects; Service requirements for cyber-physical control applications in vertical domains; Stage 1 (Release 16)," Technical Specification 22.104, Version 0.2.0, 3GPP Organizational Partners, Aug. 2018, 26 pages.
Author Unknown, "Technical Specification Group Core Network and Terminals; General Packet Radio Service (GPRS); GPRS Tunnelling Protocol (GTP) across the Gn and Gp interface (Release 15)," Technical Specification 29.060, Version 15.2.0, 3GPP Organizational Partners, Mar. 2018, 193 pages.
Author Unknown, "IEEE Standard Profile for Use of IEEE 1588 Precision Time Protocol in Power System Applications," Standard C37.238, 2017, IEEE, 42 pages.
Author Unknown, "Timing and Synchronization for Time-Sensitive Applications in Bridged Local Area Networks," IEEE Standard for Local and metropolitan area networks, Standard 802.1AS, Mar. 2011, IEEE Computer Society, 292 pages.
Author Unknown, "Precision time protocol telecom profile for phase/time synchronization with full timing support from the network," Recommendation ITU-T, G.8275.1/Y.1369.1, Jun. 2016, International Telecommunication Union, 56 pages.
Nokia, et al., "S2-188103: Synchonization," Third Generation Partnership Project (3GPP), WG2 Meeting #128-Bis, Aug. 20-24, 2018, 5 pages, Sophia Antipolis.
Nokia, et al., "S2-18111437: TSN Time Synchonization," Third Generation Partnership Project (3GPP), SA WG2 Meeting #129, Oct. 15-19, 2018, 7 pages, Dongguan, China.
Siemens AG, et al., "S1-183120: cyberCAV—5G in Industrial Automation: Different and Multiple Time Domains for Synchronization," Third Generation Partnership Project (3GPP), TSG-SA WG1 Meeting #84, Nov. 12-16, 2018, 8 pages, Spokane, WA, USA.
Examination Report for Australian Patent Application No. 2019383021, dated Mar. 18, 2022, 3 pages.
First Office Action for Chinese Patent Application No. 201980076062. 1, dated Sep. 2, 2021, 9 pages.
Office Action for Colombian Patent Application No. NC2021/0007555, dated Oct. 27, 2021, 29 pages.
Intention to Grant for European Patent Application No. 19809188.6, dated Jun. 21, 2022, 5 pages.
International Search Report and Written Opinion for International Patent Application No. PCT/IB2019/059950, dated Feb. 5, 2020, 14 pages.
International Preliminary Report on Patentability for International Patent Application No. PCT/IB2019/059950, dated Sep. 28, 2020, 7 pages.
Notice of Allowance for U.S. Appl. No. 17/295,319, dated Mar. 15, 2022, 7 pages.

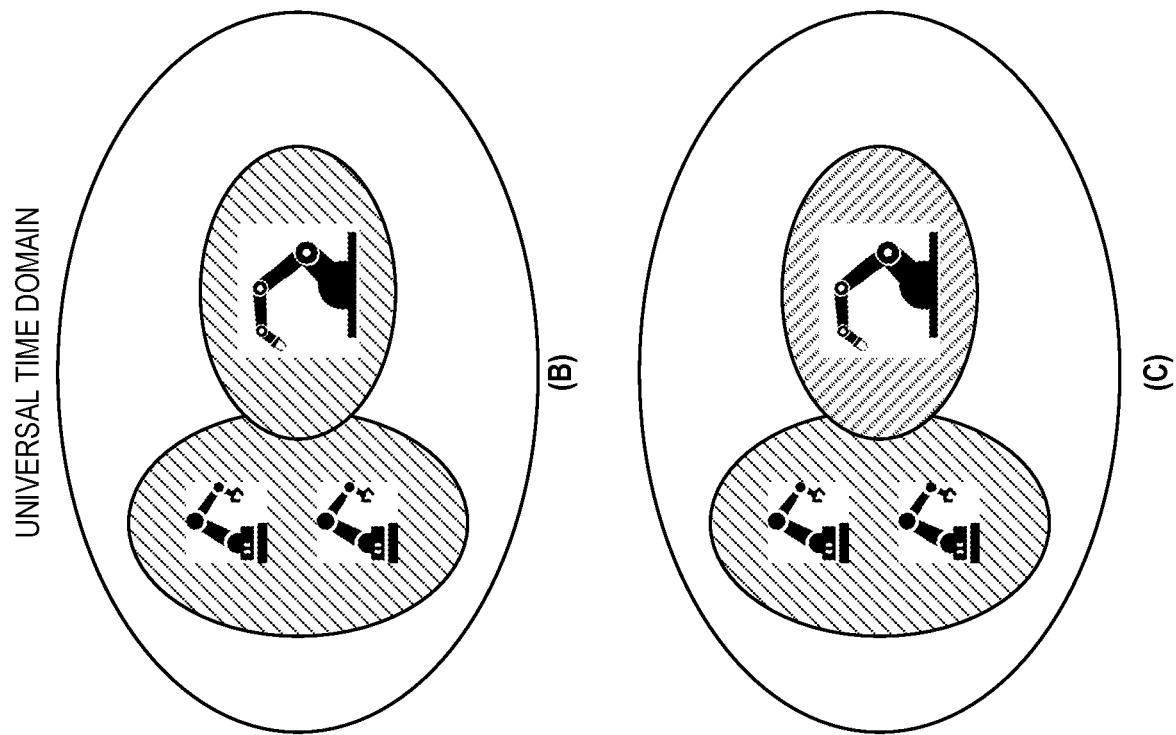
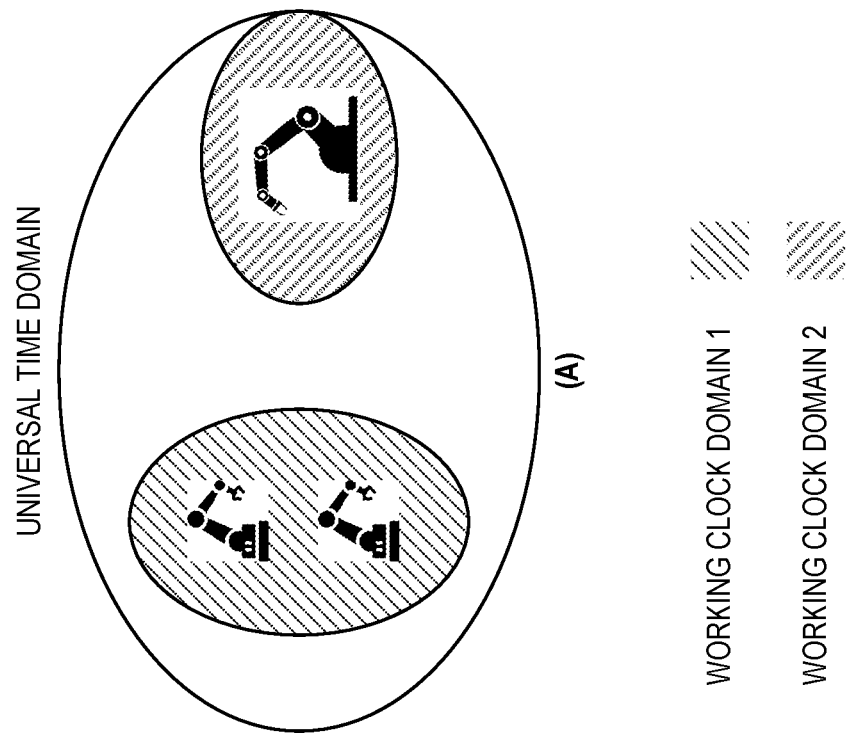
FIG. 9

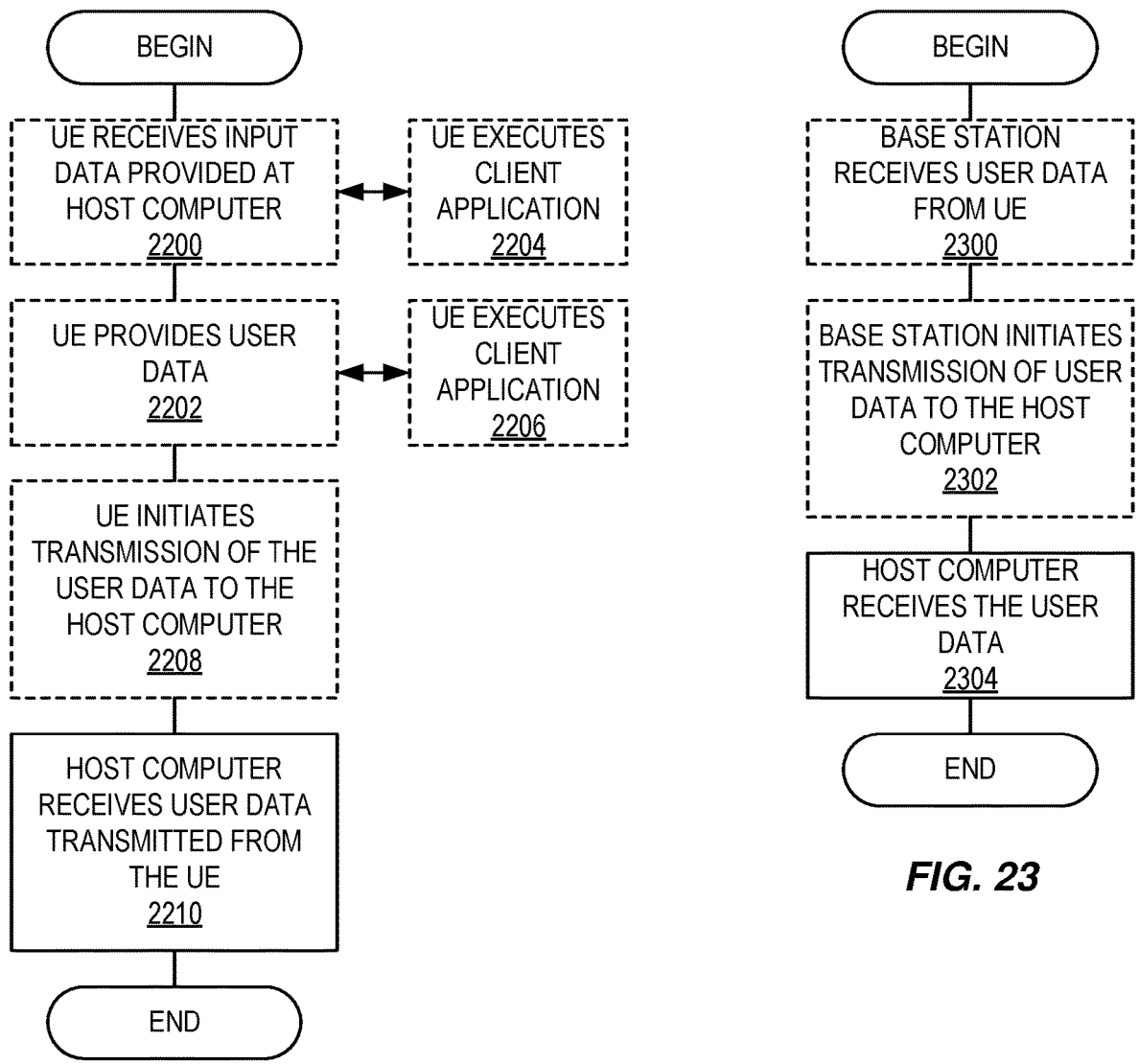

5G SYSTEM SUPPORT FOR CONVEYING TSN TIME SYNCHRONIZATION

RELATED APPLICATIONS

This application is a continuation of U.S. patent application Ser. No. 17/295,319, filed May 19, 2021, now U.S. Pat. No. 11,405,122, which is a 35 U.S.C. § 371 national phase filing of International Application No. PCT/IB2019/059950, filed Nov. 19, 2019, which claims the benefit of provisional patent application Ser. No. 62/769,390, filed Nov. 19, 2018, the disclosures of which are hereby incorporated herein by reference in their entireties.

TECHNICAL FIELD

The current disclosure relates to conveying time synchronization information.

BACKGROUND

The manufacturing industry is undergoing a digital transformation towards the "Fourth Industrial Revolution" (Industry 4.0) towards smart manufacturing. Flexible connectivity infrastructure is a key enabler for manufacturing to interconnect machines, products, and all kinds of other devices in a flexible, secure, and consistent manner.

The Third Generation Partnership Project (3GPP) Fifth Generation (5G) system, as an alternative to or complementing the wired connectivity solution, should support new requirements and challenges coming from these vertical domains. 3GPP has a study on Communication for Automation in Vertical Domains (Technical Report (TR) 22.804), where many use cases from vertical domains are analyzed. Industrial automation applications such as motion control have extremely stringent service requirements on high availability, ultra-reliable, low latency, low jitter, and determinism, e.g., 1-10 milliseconds (ms) end-to-end latency, 1-100 microsecond (µs) packet delay variation.

Today, wireline fieldbus solutions such as PROFINET®, EtherCAT®, and Ethernet/Internet Protocol (IP) are mostly used in the factory shop floor to interconnect sensors, actuators, and controllers in an automation system. Institute of Electrical and Electronics Engineers (IEEE) 802.1 Time-Sensitive Networking (TSN) as a novel technology will be able to provide manufacturing industries with deterministic, guaranteed latencies and extremely low packet loss services through standard IEEE 802 networks in the near future. Improved ways of conveying time synchronization are needed.

SUMMARY

Certain aspects of the present disclosure and their embodiments may provide solutions to the aforementioned or other challenges. Systems and methods to enable Fifth Generation (5G) system support for conveying time synchronization are provided. In some embodiments, a method performed by a wireless device for conveying external time domain information is provided. The method includes receiving a message in a first time domain used by the wireless device, the message comprising external time domain information; determining information about a second time domain based on the external time domain information; and conveying information about the second time domain to another node. In some embodiments, timing information is included into a General Packet Radio Service Tunneling Protocol (GTP) payload and the wireless device can get timing information directly from the data payload. This minimizes the Radio Access Network (RAN) and/or New Radio Base Station (gNB) impact and adds the potential for multiple time domain support.

In some embodiments, the 5G system can relay multiple time domain information to the Industrial End-stations that are belonging to different time domains.

In some embodiments, the first time domain is a 5G time domain. In some embodiments, the second time domain is a Time-Sensitive Networking (TSN) time domain.

In some embodiments, conveying information about the second time domain to another node comprises conveying information about the second time domain to an end station in the TSN time domain.

In some embodiments, the message comprises a GTP payload.

In some embodiments, conveying information about the second time domain to another node comprises conveying information about the second time domain to a translator/adaptor node that can interface between the first time domain and the second time domain.

In some embodiments, the method also includes determining that the received message includes external time domain information by inspecting a field in the received message. In some embodiments, inspecting a field in the received message comprises inspecting an EtherType field in the received message.

In some embodiments, the method also includes receiving a message in the first time domain used by the wireless device, the message comprising external time domain information for at least a third time domain.

In some embodiments, a method performed by a node for conveying external time domain information is provided. The method includes receiving a message in a second time domain based on the external time domain information; determining external time domain information about the second time domain; and conveying information about the second time domain to another node in a first time domain used by the node, the message comprising the external time domain information.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 9 illustrates an example of three time domains in an industrial automation network, according to some embodiments of the present disclosure;

FIG. 20 is a flowchart illustrating a method implemented in a communication system according to some embodiments of the present disclosure; and FIGS. 21-23 are flowcharts illustrating methods implemented in a communication system according to some embodiments of the present disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 1:
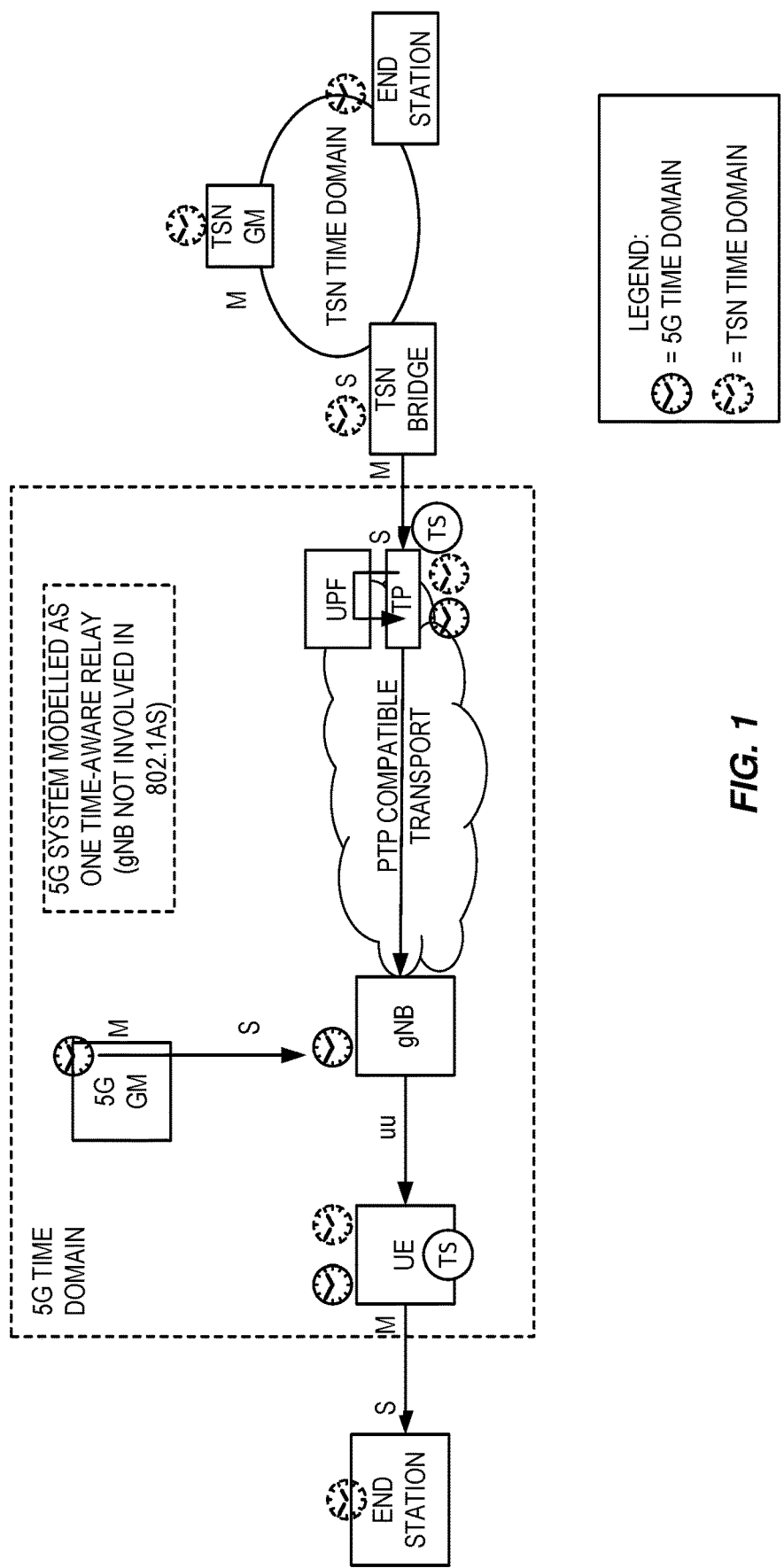
FIG. 1 illustrates an example of Time-Sensitive Networking (TSN) integration with 5G, according to some embodiments of the present disclosure.

FIG. 1 illustrates an example of Time-Sensitive Networking (TSN) integration with 5G. The timing information from TSN working domain (external clock) is delivered via the UEs to the respective End stations. This external clock is illustrated in the Figures as a dashed clock. This option assumes the 5G internal system clock (shown in the Figures as a solid clock) is made available to all nodes in the 5G system, thereby allowing the User Plane Function (UPF) (Transport Network Function (TP) function) to relay the TSN external clock along with the information of the time stamp of the TP (using 5G internal system clock) to the UE. The 5G internal system clock can be made available to the TP function at UPF through the underlying transport network between gNB and UPF. The 5G internal system clock can be made available to UE with signalling of time information related to absolute timing of radio frames (i.e., using System information Block (SIB)/Radio Resource Control (RRC) based methods described for LTE Rel-15).

The timing information (generalized Precision Time Protocol (gPTP) messages, including the information on the incoming sync message timestamping) can be carried from the UPF to the UE as data packets (e.g., payload). As an example, UPF can be configured with packet specific forwarding rules to do that.

Based on the example, for a given Packet Data Unit (PDU) Session (clock update performed for each UE via point-to-point) for that UE, one of the Ethernet destination addresses could be specific to support the gPTP operation (note, as described in IEEE 1588, the specific value 0x88F7 for the EtherType field is allocated for the case where Precision Time Protocol (PTP) messages are carried therein and could be used to simplify this operation). In some embodiments, EtherType is a two-octet field in an Ethernet frame. It is used to indicate which protocol is encapsulated in the payload of the frame. In other embodiments, this same information could be carried in a different field or in a different way.

When the timing information (e.g., TSN clock "follow_up" and "sync" messages) arrives at the UE, the UE adjusts the "follow_up" message based on the difference between time stamp of the UPF (TP) and of the UE (in this case taken when the sync message is sent to the End Station). The time stamps of UPF and UE are based on the 5G internal system clock.

There are two pieces of timing information available at UPF:
1. The external clock (illustrated as a dashed clock) (g)PTP message: e.g., "sync", "follow up" messages [IEEE 1588/802.1AS]
2. Timestamp. UPF will do the time stamping with 5G clock (illustrated as a solid clock) at the point where the (g)PTP message arrives Those two pieces of information need to be delivered from the UPF to the UE.

There currently exist certain challenge(s). Timing information can be transferred from the UPF to the UE in multiple ways.
1. Use UPF underlying transport network, with (g)PTP exchange, the Transport Network (TP)→gNB via (g)PTP protocol, then gNB send to UE using SIB/RRC to UE (TR23.734 include).
2. UPF puts information in the General Packet Radio Service Tunneling Protocol for the User Plane (GTP-U) header, →sends to RAN via GTP, then gNB gets information put it into PDCP header/xxx, then sends to the UE.
3. Ethernet PDUs (carrying (g)PTP messages) are sent from UPF to RAN via GTP-U where a new value for the GTP-U message type field indicates "Ethernet PDU". The gNB then sends the Ethernet PDU to UE using SIB/RRC.

All those solutions will have impact on the gNB. Improved ways of conveying time synchronization are needed.

Systems and methods to enable 5G system support for conveying time synchronization are provided. In some embodiments, a method performed by a wireless device for conveying external time domain information is provided. The method includes receiving a message in a first time domain used by the wireless device, the message comprising external time domain information; determining information about a second time domain based on the external time domain information; and conveying information about the second time domain to another node. In some embodiments, timing information is included into a GTP payload and the wireless device can get timing information directly from the data payload. This minimizes the RAN and/or gNB impact and adds the potential for multiple time domain support.

Figure 2:
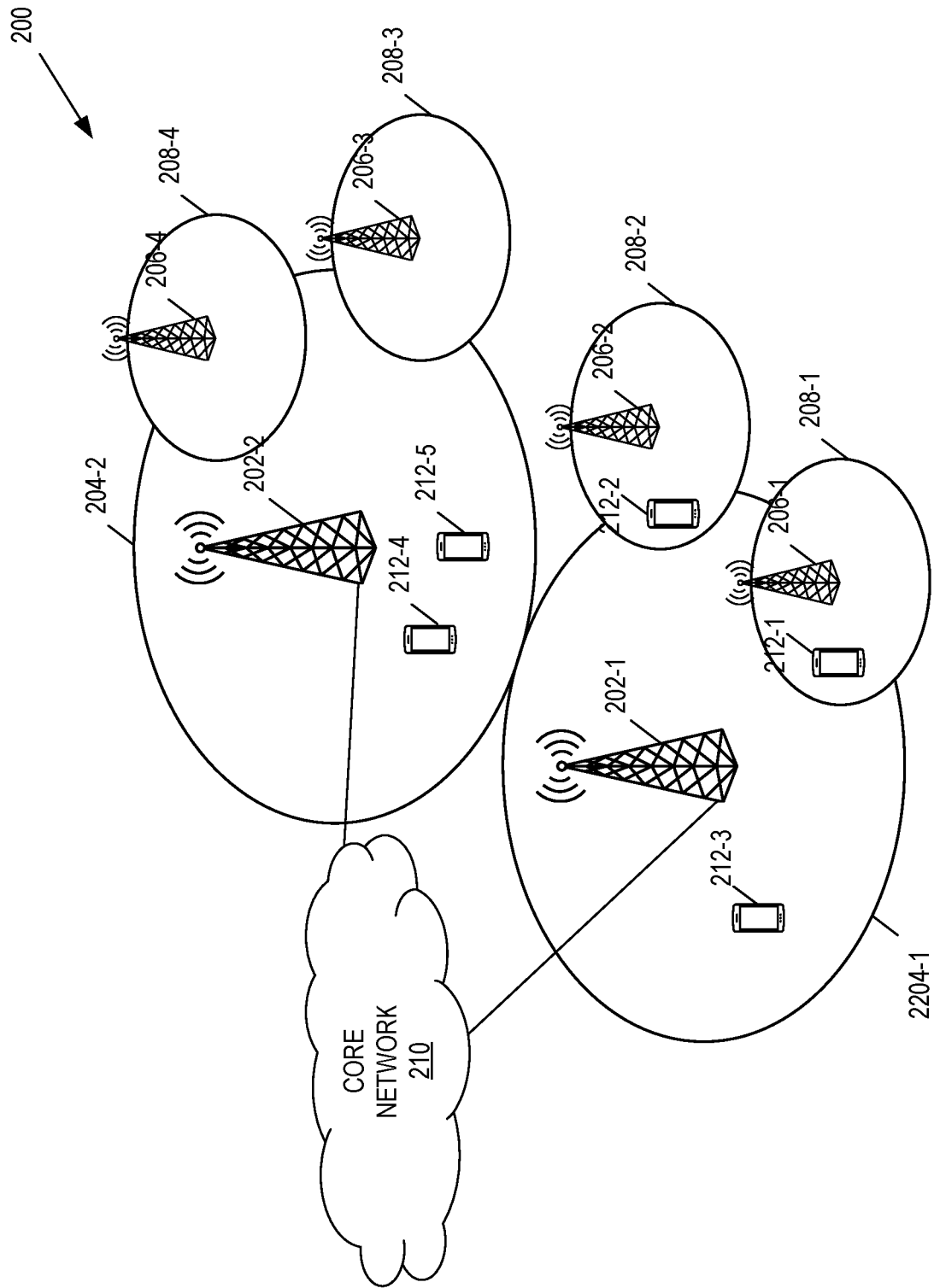
FIG. 2 illustrates one example of a cellular communications network, according to some embodiments of the present disclosure.

FIG. 2 illustrates one example of a cellular communications network 200 according to some embodiments of the present disclosure. In the embodiments described herein, the cellular communications network 200 is a 5G NR network. In this example, the cellular communications network 200 includes base stations 202-1 and 202-2, which in LTE are referred to as eNBs and in 5G NR are referred to as gNBs, controlling corresponding macro cells 204-1 and 204-2. The base stations 202-1 and 202-2 are generally referred to herein collectively as base stations 202 and individually as base station 202. Likewise, the macro cells 204-1 and 204-2 are generally referred to herein collectively as macro cells 204 and individually as macro cell 204. The cellular communications network 200 may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The base stations 202 (and optionally the low power nodes 206) are connected to a core network 210.

The base stations 202 and the low power nodes 206 provide service to wireless devices 212-1 through 212-5 in the corresponding cells 204 and 208. The wireless devices 212-1 through 212-5 are generally referred to herein collectively as wireless devices 212 and individually as wireless device 212. The wireless devices 212 are also sometimes referred to herein as UEs.

Figure 3:
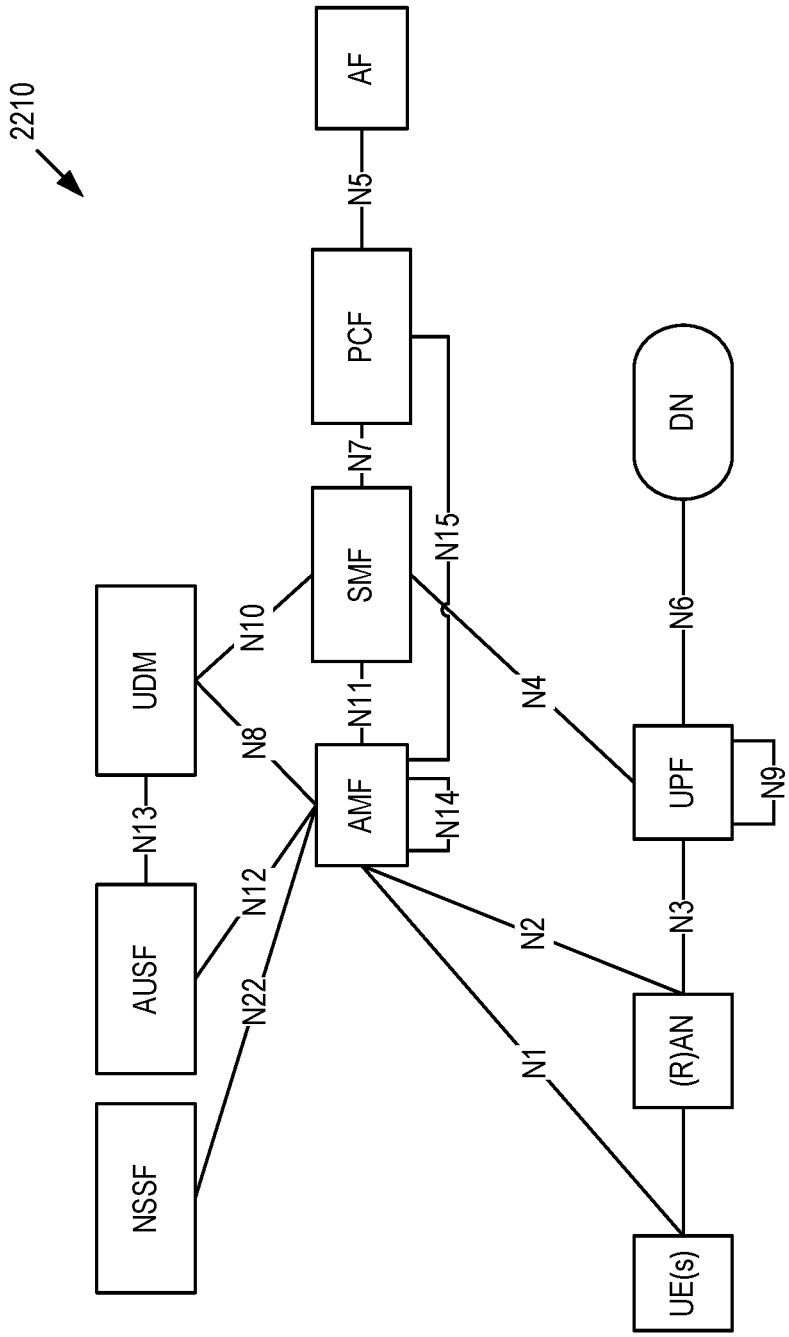
FIG. 3 illustrates a wireless communication system represented as a Fifth Generation (5G) network architecture composed of core Network Functions (NFs), according to some embodiments of the present disclosure.

FIG. 3 illustrates a wireless communication system represented as a 5G network architecture composed of core Network Functions (NFs), where interaction between any two NFs is represented by a point-to-point reference point/interface. FIG. 3 can be viewed as one particular implementation of the system 200 of FIG. 2.

Seen from the access side the 5G network architecture shown in FIG. 3 comprises a plurality of User Equipment (UEs) connected to either a Radio Access Network (RAN) or an Access Network (AN) as well as an Access and Mobility Management Function (AMF). Typically, the R(AN) comprises base stations, e.g., such as evolved Node Bs (eNBs) or 5G base stations (gNBs) or similar. Seen from the core network side, the 5G core NFs shown in FIG. 3 include a Network Slice Selection Function (NSSF), an Authentication Server Function (AUSF), a Unified Data Management (UDM), an AMF, a Session Management Function (SMF), a Policy Control Function (PCF), and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMP, respectively. N12 is required for the AMF to perform authentication of the UE. N8 and N10 are defined because the subscription data of the UE is required for the AMF and SMF.

The 5G core network aims at separating user plane and control plane. The user plane carries user traffic while the control plane carries signaling in the network. In FIG. 3, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 3. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 4:
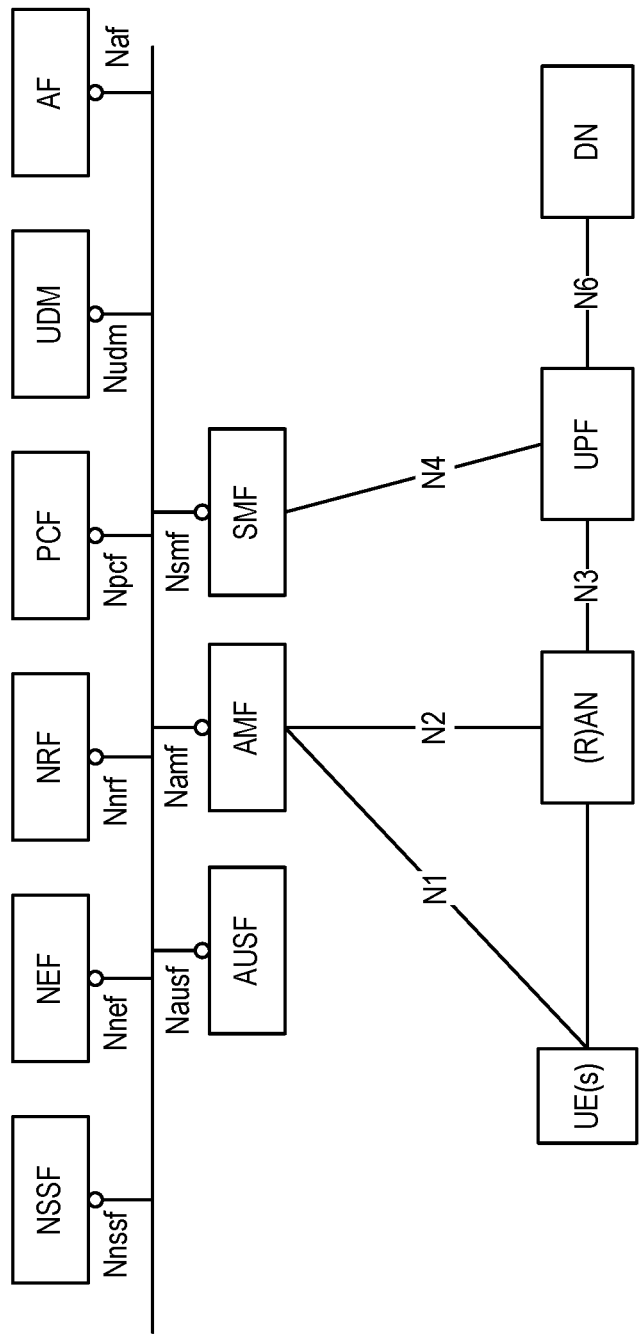
FIG. 4 illustrates a 5G network architecture using service-based interfaces between the NFs in the control plane, instead of the point-to-point reference points/interfaces used in the 5G network architecture of FIG. 3, according to some embodiments of the present disclosure.

FIG. 4 illustrates a 5G network architecture using service-based interfaces between the NFs in the control plane, instead of the point-to-point reference points/interfaces used in the 5G network architecture of FIG. 3. However, the NFs described above with reference to FIG. 3 correspond to the NFs shown in FIG. 4. The service(s) etc. that a NF provides to other authorized NFs can be exposed to the authorized NFs through the service-based interface. In FIG. 4 the service based interfaces are indicated by the letter "N" followed by the name of the NF, e.g., Namf for the service based interface of the AMF and Nsmf for the service based interface of the SMF etc. The Network Exposure Function (NEF) and the Network Repository Function (NRF) in FIG. 4 are not shown in FIG. 3 discussed above. However, it should be clarified that all NFs depicted in FIG. 3 can interact with the NEF and the NRF of FIG. 4 as necessary, though not explicitly indicated in FIG. 3.

Some properties of the NFs shown in FIGS. 3 and 4 may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 5:
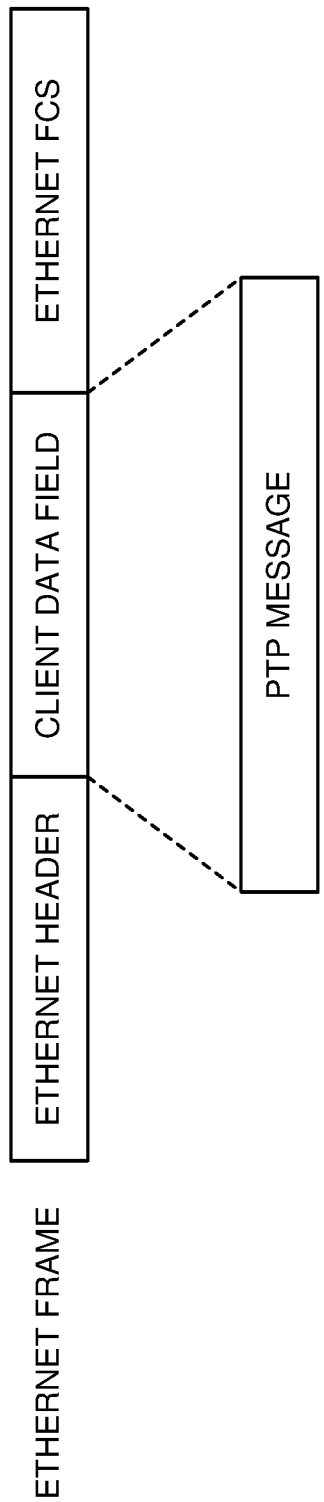
FIG. 5 illustrates an embodiment where a Precision Time Protocol (PTP) message is sent over Ethernet, according to some embodiments of the present disclosure.

There are several options for (g)PTP transport. Some embodiments herein relate to two variations. FIG. 5 illustrates an embodiment where (g)PTP is sent over Ethernet.

When carried over Ethernet, the first byte of the (g)PTP occupies the first byte of the client data field of the ETH frame. The ETH type field is set to 0x88F7 and identifies the client data field as a (g)PTP message.

UPF/UE can use 0x88F7 to detect it is a (g)PTP message. Timing information is transferred as payload, and (g)PTP, TS is handled by a Translator. In this option, the translator/adaptor function between the TSN bridge and the UPF will have the functions to support time stamping and (g)PTP protocol. The translator/adaptor is synced with the 5G clock (solid clock). This can be done through underlying transport network. The 5G clock can come from gNB to UPF then to translator.

1. PTP message from the TSN bridge arrives at Translator, Translator detects it for (g)PTP message according to the method described herein. In some embodiments, this is referred to as the ingress into the 5G clock domain.
2. If the arrival frame/packet is confirmed as (g)PTP message, the translator will timestamp it with 5G clock time. This can be called TS_translator_upf. In some embodiments, when gPTP arrives at UPF, includes: TSN time=a, correctionfield values from TSN (but accumulates various contributions along the chain)=b.
3. Translator modifies the (g)PTP message and also the Ethernet header.
   a. Modify the original incoming (g)PTP message by appending the TS_translator_upf into a "Suffix" field. The Ethernet head will make changes accordingly, e.g., change of packet size. But the Ethernet Type should be kept as original so that it indicates it is a (g)PTP message. In some embodiments, after TT at UPF side, the gPTP message includes: TSN time=a, correctionfield values from TSN (but accumulates various contributions along the chain)=b, suffix=c (TS_upf_translator).
   b. Translator (UPF side) has (g)PTP support function, alternatively, it can directly change the (g)PTP body; for example, the "correction" field (in case of two step clock this is in the follow_up message). In some embodiments, after TT at UPF side, the gPTP message includes: TSN time=a, correctionfield values from TSN (but accumulates various contributions along the chain)=TS_upf_translator−b.
4. The modified (g)PTP message then arrives at UPF, UPF considers it as a payload, and the UPF transmit it in normal 3GPP procedure. For example, the Ethernet PDU session is between UE and UPF, the UPF directly takes the receiving frame from the translator and puts it into GTP payload and sets destination to gNB. Then gNB decapsulates GTP and adds a Packet Data Convergence Protocol (PDCP) header and transmits it to UE. UE removes the 3GPP stack and get the original ETH frame as the output of the Translator (UPF side).
5. Translator (UE side) can detect the payload according to the methods described herein.
6. Translator is supporting (g)PTP and decoding (g)PTP message.
   a. When using the (g)PTP suffix method to carry the translator timestamp, the UE side translator is implementation specific, it can read both (g)PTP body message and suffix,
   b. In the alternative case, as step 3b, the translator is using the standard (g)PTP method to read the (g)PTP message, and the "correction" field value
7. Translator (UE side) does time stamping with 5G clock, TS_translator_UE, and calculates the difference between the TS_translator_UE and TS_translator_upf, which is a TS_delta.

8. Translator (UE side) generates a new (g)PTP message towards End stations, with changes of (g)PTP correctionfield=TS_delta. In some embodiments, this is referred to as the egress from the 5G clock domain. In some embodiments, according to method 3a, NEW PTP at output of UE side translator includes: TSN time=a, correctionfield=b+TS_delta (5G residence time). In some embodiments, according to method 3b, NEW PTP at output of UE side translator includes: TSN time=a, correctionfield=TS_translator_ue−(TS_tran_upf−b).

Figure 6:
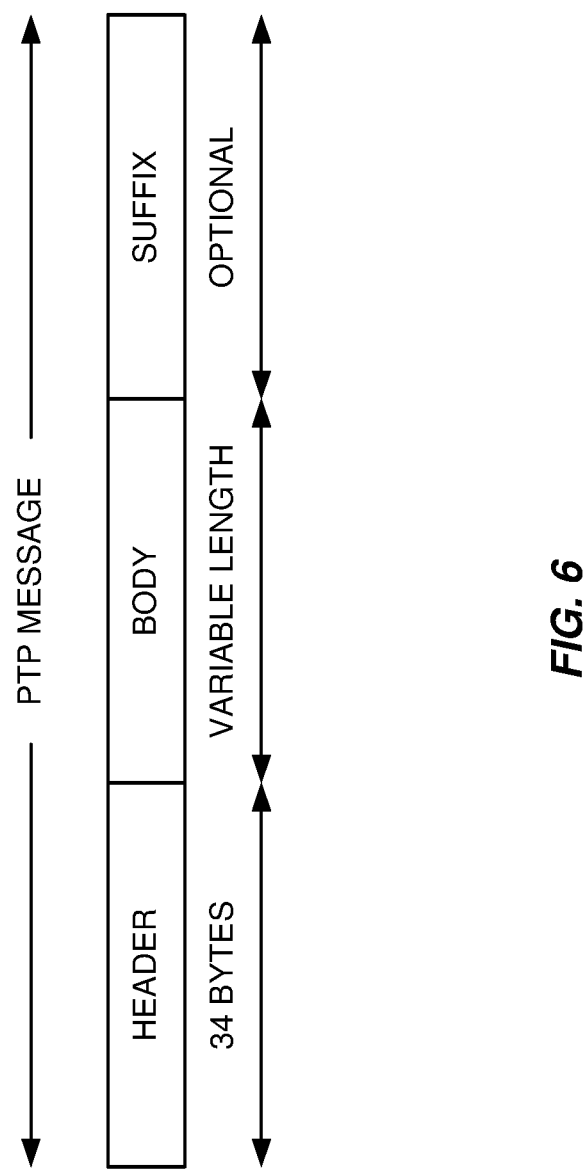
FIG. 6 illustrates an example of using a suffix in (g)PTP message to carry the timestamp information, according to some embodiments of the present disclosure.

FIG. 6 illustrates an example of using a suffix in the (g)PTP message to carry the timestamp information. The translator/adaptor function can be either implemented as a standalone entity as FIG. 7 shows, or it can be included as part of the UPF and the UE as is shown in FIG. 8.

Figure 7:
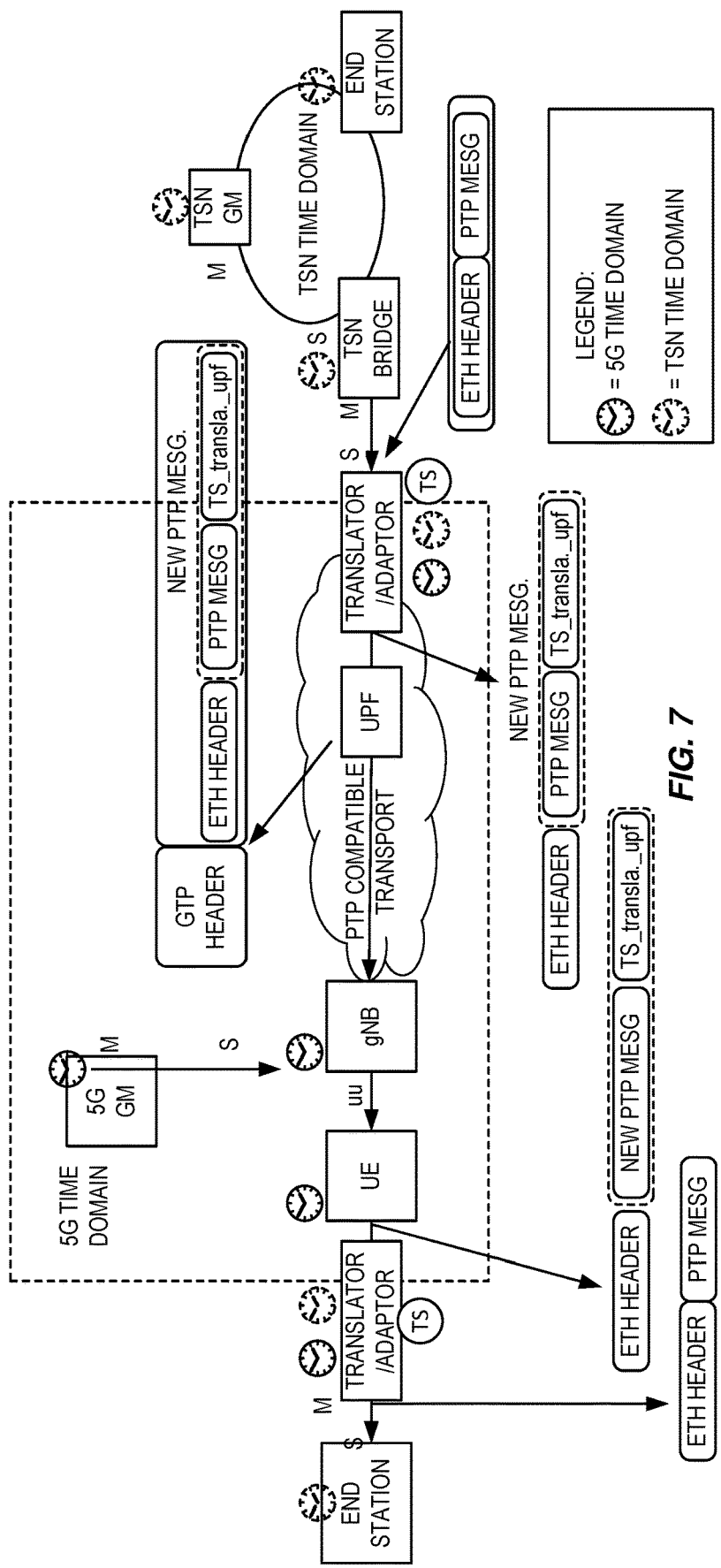
FIG. 7 illustrates an embodiment with a 5G blackbox model, according to some embodiments of the present disclosure.

FIG. 7 illustrates an embodiment with a 5G blackbox model. In some embodiments, the entire 5G system can be kept untouched, therefore there will be minimal impact on the 5G system nodes. The translator/adaptor function located at the edge of the 5G system can take care of all 802.1AS related functions. For example, the (g)PTP support, time stamping, and/or Best Master Clock Algorithm (BMCA) can be all implemented in the translator. The translator function can be implemented either as part of UPF/UE, or as a stand-alone entity.

Figure 8:
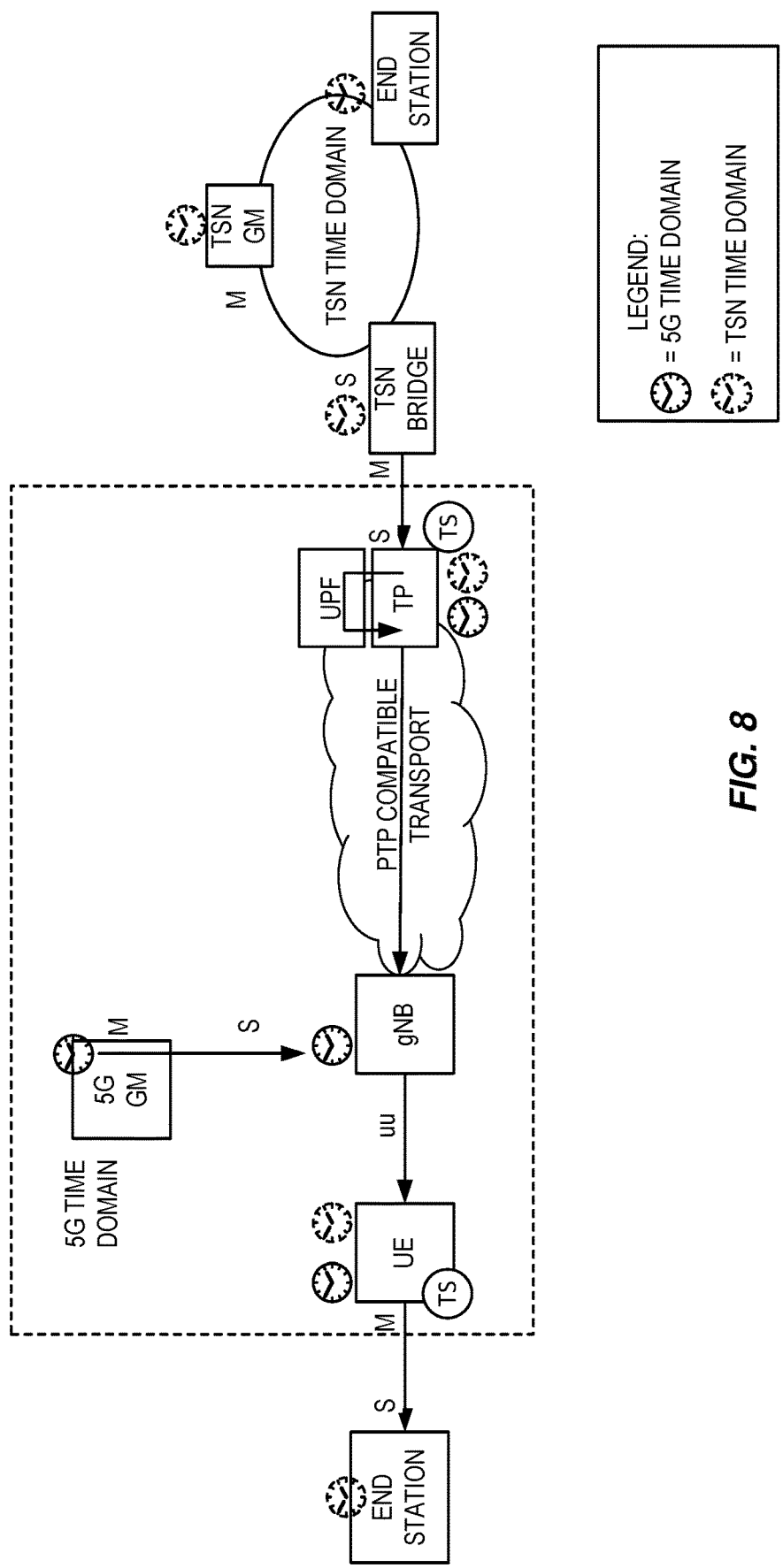
FIG. 8 illustrates an embodiment where the 5G system acts as a compliant TSN "time-aware relay", according to some embodiments of the present disclosure.

FIG. 8 illustrates an embodiment where the 5G system acts as a compliant TSN "time-aware relay." In some embodiments, it is a type of "distributed boundary clock" implementation, or in a 802.1AS term "distributed time-aware relay". In some embodiments, only the network elements at the edges of the 5G system (e.g., the UE on the left and the Transport Network Function (TP) of the UPF on the right) need to support the IEEE 802.1AS operations. The 5G internal system clock will keep these network elements synchronized so that the timestamping of the gPTP event messages is done correctly. In some embodiments, the 5G system has to properly handle the BMCA (in particular, handling the gPTP Announce messages) in order to properly set up the state of the (g)PTP ports and select the Grand Master (GM). The location of BMCA function can be implementation independent. Given the specific operation described by the IEEE 802.1AS, the actual timing operation consists in the processing of the correction field in the sync message (as well as of the proper handling of the peer-to-peer delay operations). The correct operation is guaranteed by keeping the UE clock and the TP clock supporting the UPF, synchronous among them (in this case synchronous to the 5G internal system clock).

In some embodiments, the timing information from TSN working domain (external clock) is delivered via the UEs to the respective End stations. In some embodiments, this option assumes the 5G internal system clock (solid clock) is made available to all nodes in the 5G system, thereby allowing the UPF (and/or TP function) to relay the TSN external clock along with the information of the time stamp of the TP (using 5G internal system clock) to the UE. The 5G internal system clock can be made available to the TP function at UPF through the underlying transport network between gNB and UPF. The 5G internal system clock can be made available to the UE with signalling of time information related to absolute timing of radio frames (e.g., using SIB/RRC based methods described for LTE Rel-15). The timing information (gPTP messages, including the information on the incoming sync message timestamping) can be carried from the UPF to the UE as data packets (e.g., payload). As an example, the UPF can be configured with packet specific forwarding rules to do that. For a given PDU Session for that UE, one of the destination addresses could be specific to support the gPTP operation (note, in some embodiments, a specific Ethertype is allocated to (g)PTP messages and could be used to simplify this operation). In some embodiments, when the timing information (e.g., TSN clock "follow_up" and "sync" messages) arrive at the UE, the UE adjusts the "follow_up" message based on the difference between time stamp of the UPF (TP) and of the UE (in this case taken when the sync message is sent to the End Station). The time stamp of UPF and UE are based on the 5G internal system clock.

FIG. 8 illustrates an example of how 5G system can transparently convey the TSN timing to the UE. There are two time domains in the figure, the 5G time domain (solid clocks) and TSN time domain (dashed clocks). The 5G system is modelled as one transparent clock.

The 5G system has its own clock reference, e.g., a 5G Grand Master (GM), serving for the radio related functions. gNBs are synchronized with the 5G GM. The 5G clock can be made available for UEs with signalling of time information related to absolute timing of radio frames. In some embodiments, the transport network function (TP) of UPF can be synchronized with the 5G clock through underlayer transport network between gNB and UPF using (g)PTP. In some embodiments, the transport network function (TP) of the UPF performs time stamping using 5G clock when (g)PTP flow enter the TP.

The TSN bridge and end stations belong to the same TSN working time domain. The bridge and end station on the right side of the 5G system are synchronized with TSN GM. In order to transfer the TSN timing from the bridge to the End station on the left side of 5G system, the 5G system in the example is modelled as a transparent clock such as defined in IEEE 1588. In these embodiments, the bridge port connected to the UPF is acting as master, the End station act as Slave Only Ordinary Clock (SOOC) connected to the UE. In these embodiments, the UPF can timestamp the incoming (g)PTP messages from the TSN bridge and relay the stamped time together with TSN timing information to the UE as part of data transmission. In some embodiments, the UE adjusts the TSN "follow_up" message with the difference between time stamp of the UPF (TP) and the UE at arrival of the TSN clocks.

It should be noted that IEEE 802.1AS does not describe the use of (g)PTP clocks compliant with the operation of an IEEE 1588 transparent clocks. In fact, in gPTP there are only two types of time-aware systems: time-aware end stations and time-aware relays, while IEEE 1588 has ordinary clocks, boundary clocks, end-to-end transparent clocks, and P2P transparent clocks. A time-aware end station corresponds to an IEEE 1588 ordinary clock, and a time-aware relay is a type of IEEE 1588 boundary clock.

In some embodiments, another way to implement the transparent sync channel is by equalizing the delays in both directions of the 5G system (e.g., uplink and downlink). In practice the 5G system emulates the behavior of a (direct) (g)PTP link.

In some embodiments, there could also be a new GTP-U Message Type Value. (g)PTP packets can be embedded within Ethernet PDUs using a Type field=0x88F7 (PTP over Ethernet per IEEE 1588) and delivered to the UPF. The UPF normally deals with the delivery of Ethernet PDU containing user plane payload (i.e., UE specific Ethernet PDUs) whereas in this case the UPF is required to relay non-device specific control information (i.e., working clock information carried within an Ethernet PDU) to a gNB for further distribution to UEs. One possible solution can be as follows:

Ethernet PDUs containing (g)PTP messages can be forwarded through the 5G network to the gNB the same way as end device specific Ethernet PDUs are (i.e., using the S1-U interface) but using the destination Medium Access Control (MAC) address specific to (g)PTP message distribution.

This MAC address is used to ensure complete end-to-end support of (g)PTP, instead of transmission of packets through any network element that does not support (g)PTP. This MAC address is the default address for G.8275.1 (PTP Profile for time or phase distribution) and a node with this MAC address (e.g., UPF) is a node that supports processing of (g)PTP packets.

The UPF sends an Ethernet PDU (with a MAC addresses indicating (g)PTP message encapsulation) within the context of a protocol stack consisting of (g)PTP/Ethernet/GTP-U/UDP/IP.

The GTP-U layer terminates at the gNB and therefore requires the gNB to perform inspection of the GTP-U message type field per legacy operation. However, a new message type field value indicating "Ethernet PDU" can be introduced (e.g., decimal values 106-111 are available for future use-3GPP TS 29.060) to allow the UPF to indicate to the gNB that GTP-U PDU payload consists of control plane information carried within an Ethernet PDU.

Upon receiving a GTP-U PDU with message type field indicating "Ethernet PDU" the gNB then examines the destination MAC address of the Ethernet PDU carried by that GTP-U PDU and determines that it is set to 0x88F7 (i.e., a (g)PTP message is carried within the Ethernet PDU).

The gNB can then decide to either (a) use a broadcast message to transmit the Ethernet PDU and thereby minimize the amount of bandwidth needed to relay the (g)PTP/Ethernet PDU over the radio interface or (b) send the Ethernet PDU to all UEs under its control using RRC messages addressed to individual UEs.

For case (b) the means by which a gNB can determine the set of RNTIs to use for Ethernet PDU distribution can be seen as an implementation specific function.

This solution allows for eliminating the use of the IP layer within the protocol stack used between the UPF and gNB as well as eliminating the possible involvement of the MME for routing the (g)PTP/Ethernet PDU payload (i.e., the MME is control plane oriented but this solution proposes an exception case wherein the MME can be bypassed for the case of routing TSN working clock information to UEs via the gNB)

The same embodiments described herein can also be applied to multidomain use cases. In some embodiments, an industrial automation network consists of two or more time domains. Therefore, the integration of 5G in industrial automation requires that the 5G system shall be able to support different time domains for synchronization. FIG. 9 illustrates an example of three time domains in an industrial automation network. In part (A) of FIG. 9, the first time domain is "universal time domain" which is used to align operations and events chronologically in the factory. There are also two working clock domains that consists of one or a set of machines. Different working clock domains may have different timescales and synchronisation accuracy.

Due to the mobility, different working clock domains may interact with each other. Part (B) of FIG. 9 illustrates an embodiment where the Working Clock domains merge into one. Part (C) of FIG. 9 illustrates an embodiment where the members of the different Working Clock domains interact while keeping their own separate time synchronizations.

In some embodiments, a single clock domain is sufficient and a suitable one could be provided by the 5G system itself (in fact, it normally has to operate synchronous with an internationally recognized standard such as GPS).

In some embodiments, the UE only receives 5G timing information through the gNB, and acts as the master clock to the TSN end stations. In some embodiments, the TSN bridges and End stations also receive timing information from the 5G GM via UPF and under layer transport network. Therefore, all connected domains are locked to the 5GS clock (same universal time; all working clock domains synchronous to the universal time).

Figure 10:
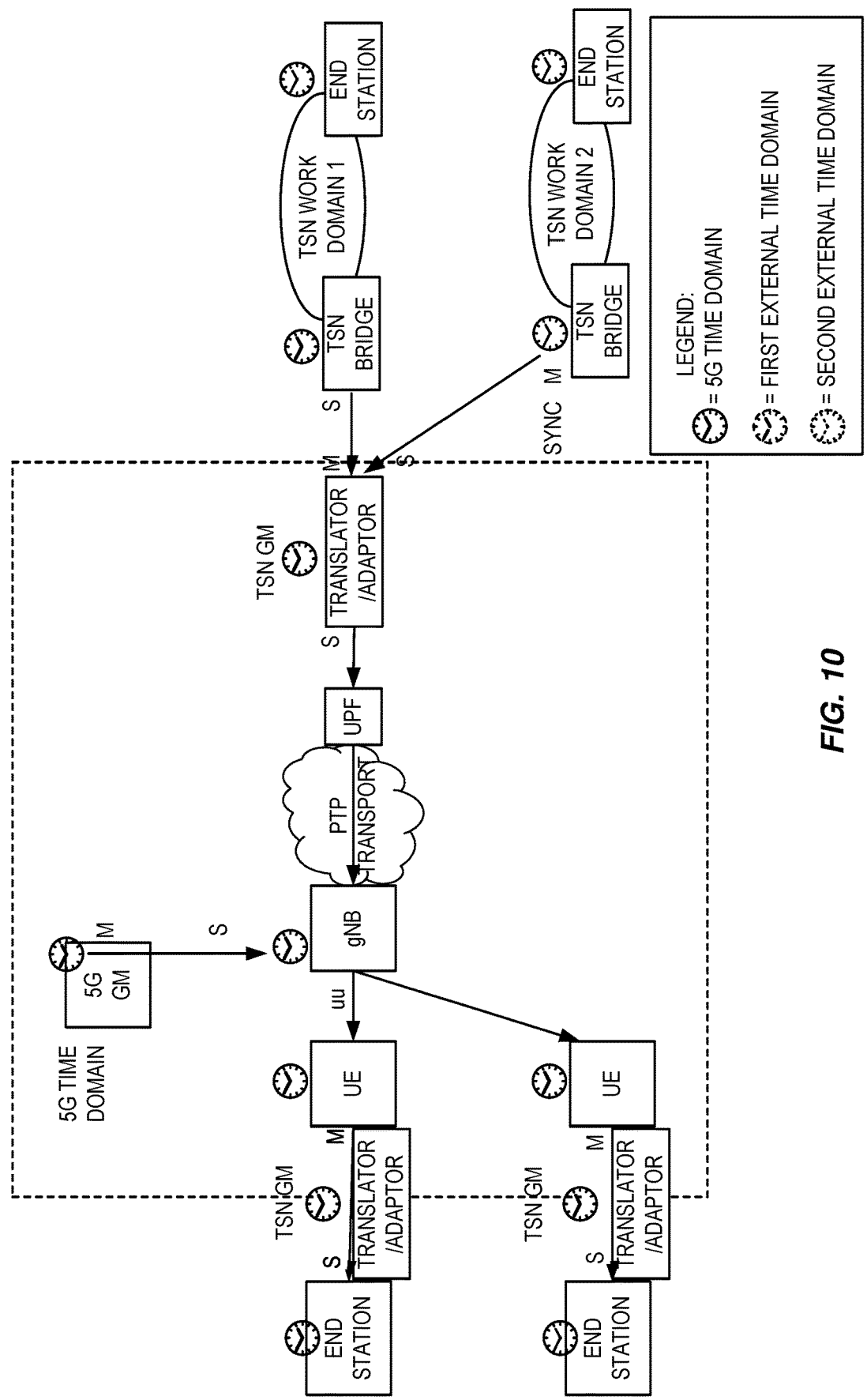
FIG. 10 illustrates an embodiment with two external clocks, according to some embodiments of the present disclosure.

In this case, each interface of the 5G system is seen by the connected TSN networks and by the End stations, as separate GMs, each of them operating in independent gPTP domains, but providing the same time to all the connected networks. For example, the 5G clock at the transport function (TP) of the UPF is acting as TSN GM and provides GM reference to the TSN Work Domains 1 and 2. The 5G clock at UEs acts as TSN GM for the End stations that belong to TSN Work Domains 1 and 2 respectively. FIG. 10 illustrates an embodiment with two external clocks, according to some embodiments of the present disclosure.

Figure 11:
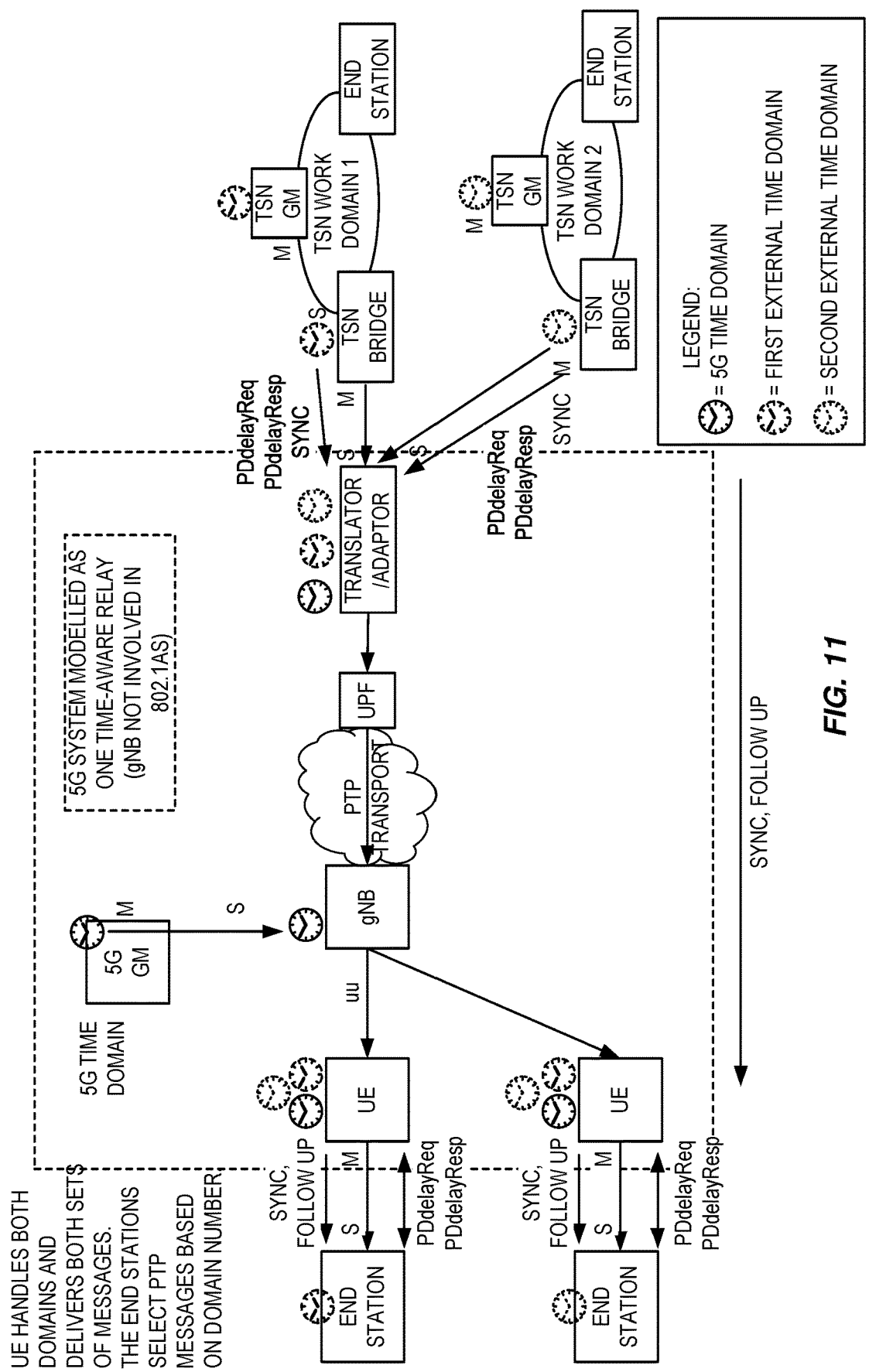
FIG. 11 illustrates an embodiment with two external clocks, according to some embodiments of the present disclosure.

FIG. 11 illustrates an embodiment with two external clocks (illustrated as a dashed clock similar to the previous figures and a clock with smaller dashes). Messages associated with the first external clock and the second external clock may be differentiated by the (g)PTP domainNumber attribute. The UE translator will handle both (g)PTP instances; one takes care of the first external clock domain, one takes care of the second external clock domain While only two external clocks are shown for simplicity, this disclosure is not limited thereto. In some embodiments, the End Stations select (g)PTP messages based on domainNumber.

An alternative option can be an implementation with 5G blackbox model as described above. In such an implementation, the entire 5G system can be kept untouched, therefore there will have minimal impact on the 5G system nodes. The translator/adaptor function located at the edge of 5G system can take care all 802.1AS related functions. For example, the (g)PTP support, time stamping, can be all implemented in the translator. The translator function can be implemented either as part of UPF/UE, or as a stand-alone entity.

Figure 12:
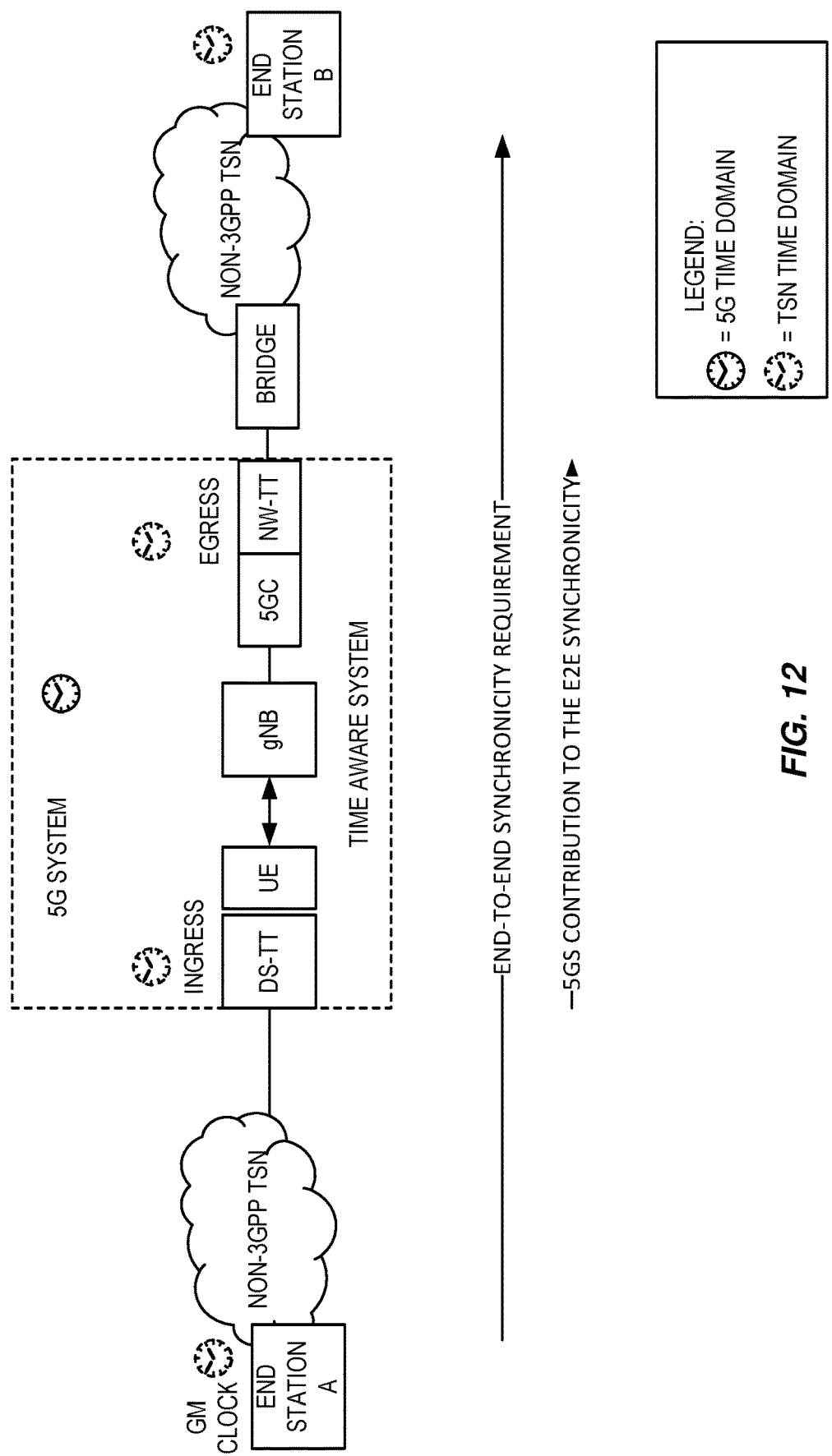
FIG. 12 illustrates an example where an End Station A is communicating time synchronicity to an End Station B, both of which are in a TSN time domain, according to some embodiments of the present disclosure.

FIG. 12 illustrates an example where an End Station A is communicating time synchronicity to an End Station B, both of which are in a TSN time domain. In this embodiment, the 5G system contributes to this End-to-End (E2E) synchronicity requirement by operating as an ingress and egress. As shown in FIG. 12, in this embodiment, the UE acts as the ingress to the 5G system while the 5GC acts as the egress from the 5G system. Any of the embodiments discussed above could be used to communication this time related information.

Figure 13:
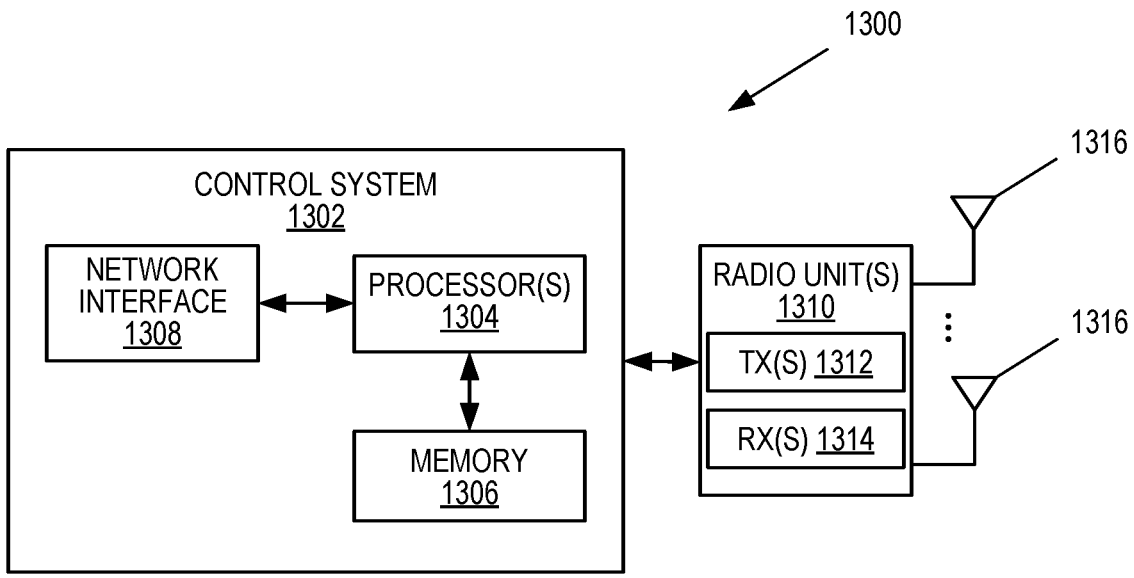
FIG. 13 is a schematic block diagram of a radio access node according to some embodiments of the present disclosure.

FIG. 13 is a schematic block diagram of a translator node 1300 according to some embodiments of the present disclosure. The translator node 1300 may be, for example, a base station 202 or 206. As illustrated, the translator node 1300 includes a control system 1302 that includes one or more processors 1304 (e.g., Central Processing Units (CPUs), Application Specific Integrated Circuits (ASICs), Field Programmable Gate Arrays (FPGAs), and/or the like), memory 1306, and a network interface 1308. The one or more processors 1304 are also referred to herein as processing circuitry. In addition, the translator node 1300 includes one or more radio units 1310 that each includes one or more transmitters 1312 and one or more receivers 1314 coupled to one or more antennas 1316. The radio units 1310 may be referred to or be part of radio interface circuitry. In some embodiments, the radio unit(s) 1310 is external to the control system 1302 and connected to the control system 1302 via, e.g., a wired connection (e.g., an optical cable). However, in some other embodiments, the radio unit(s) 1310 and potentially the antenna(s) 1316 are integrated together with the control system 1302. The one or more processors 1304 operate to provide one or more functions of a translator node 1300 as described herein. In some embodiments, the function(s) are implemented in software that is stored, e.g., in the memory 1306 and executed by the one or more processors 1304.

Figure 14:
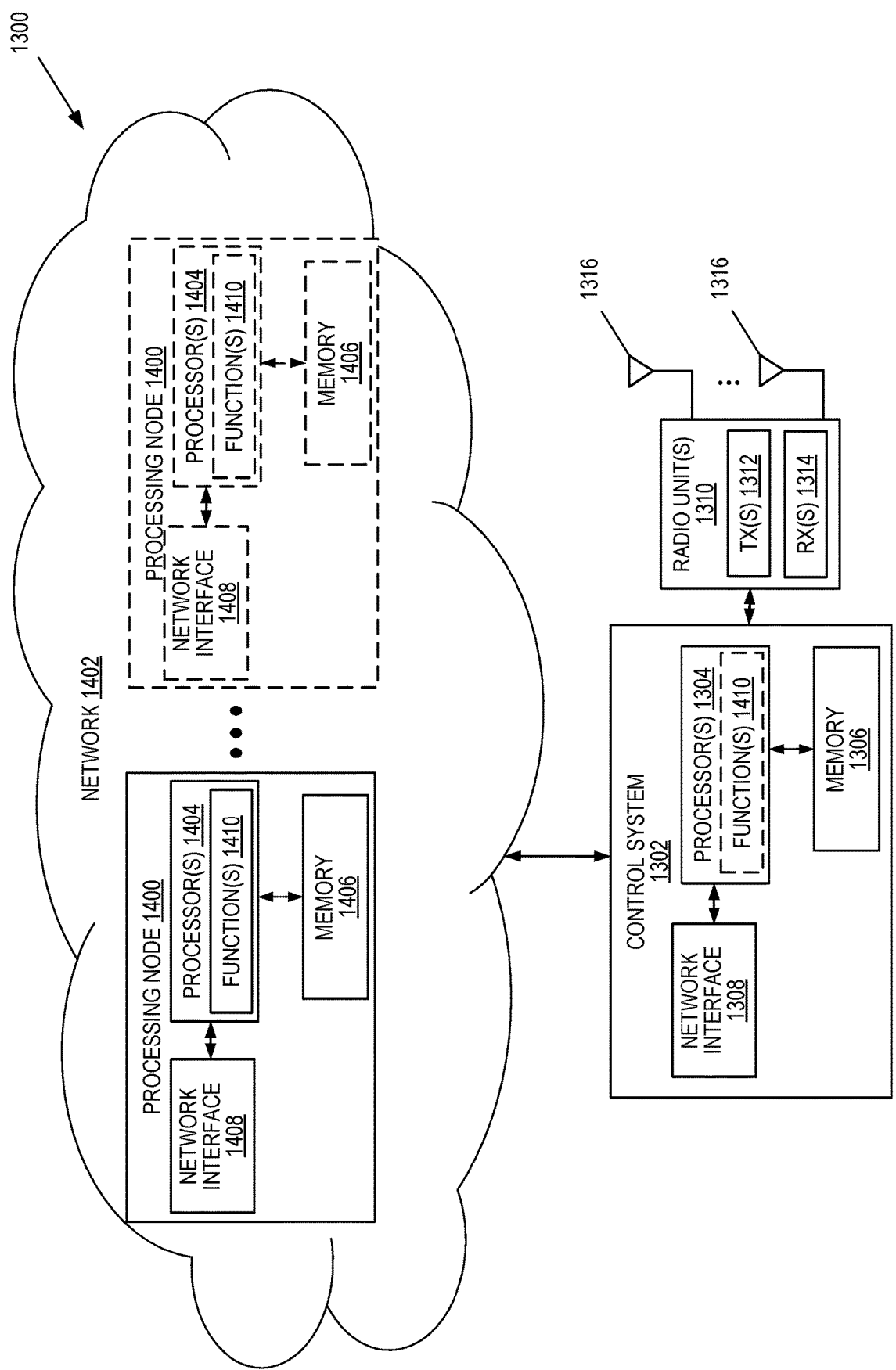
FIG. 14 is a schematic block diagram that illustrates a virtualized embodiment of the radio access node according to some embodiments of the present disclosure.

FIG. 14 is a schematic block diagram that illustrates a virtualized embodiment of the translator node 1300 according to some embodiments of the present disclosure. This discussion is equally applicable to other types of network nodes. Further, other types of network nodes may have similar virtualized architectures.

As used herein, a "virtualized" radio access node is an implementation of the translator node 1300 in which at least a portion of the functionality of the translator node 1300 is implemented as a virtual component(s) (e.g., via a virtual machine(s) executing on a physical processing node(s) in a network(s)). As illustrated, in this example, the translator node 1300 includes the control system 1302 that includes the one or more processors 1304 (e.g., CPUs, ASICs, FPGAs, and/or the like), the memory 1306, and the network interface 1308 and the one or more radio units 1310 that each includes the one or more transmitters 1312 and the one or more receivers 1314 coupled to the one or more antennas 1316, as described above. The control system 1302 is connected to the radio unit(s) 1310 via, for example, an optical cable or the like. The control system 1302 is connected to one or more processing nodes 1400 coupled to or included as part of a network(s) 1402 via the network interface 1308. Each processing node 1400 includes one or more processors 1404 (e.g., CPUs, ASICs, FPGAs, and/or the like), memory 1406, and a network interface 1408.

In this example, functions 1410 of the translator node 1300 described herein are implemented at the one or more processing nodes 1400 or distributed across the control system 1302 and the one or more processing nodes 1400 in any desired manner. In some particular embodiments, some or all of the functions 1410 of the translator node 1300 described herein are implemented as virtual components executed by one or more virtual machines implemented in a virtual environment(s) hosted by the processing node(s) 1400. As will be appreciated by one of ordinary skill in the art, additional signaling or communication between the processing node(s) 1400 and the control system 1302 is used in order to carry out at least some of the desired functions 1410. Notably, in some embodiments, the control system 1302 may not be included, in which case the radio unit(s) 1310 communicate directly with the processing node(s) 1400 via an appropriate network interface(s).

In some embodiments, a computer program including instructions which, when executed by at least one processor, causes the at least one processor to carry out the functionality of translator node 1300 or a node (e.g., a processing node 1400) implementing one or more of the functions 1410 of the translator node 1300 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
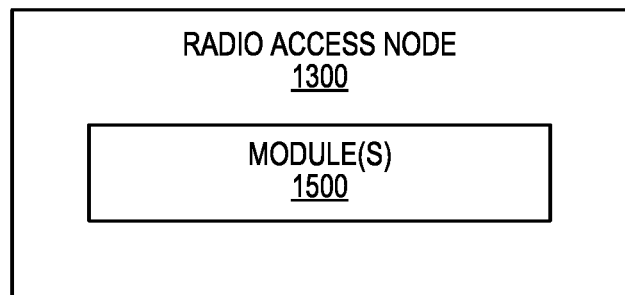
FIG. 15 is a schematic block diagram of the radio access node according to some other embodiments of the present disclosure.

FIG. 15 is a schematic block diagram of the translator node 1300 according to some other embodiments of the present disclosure. The translator node 1300 includes one or more modules 1500, each of which is implemented in software. The module(s) 1500 provide the functionality of the translator node 1300 described herein. This discussion is equally applicable to the processing node 1400 of FIG. 14 where the modules 1500 may be implemented at one of the processing nodes 1400 or distributed across multiple processing nodes 1400 and/or distributed across the processing node(s) 1400 and the control system 1302.

Figure 16:
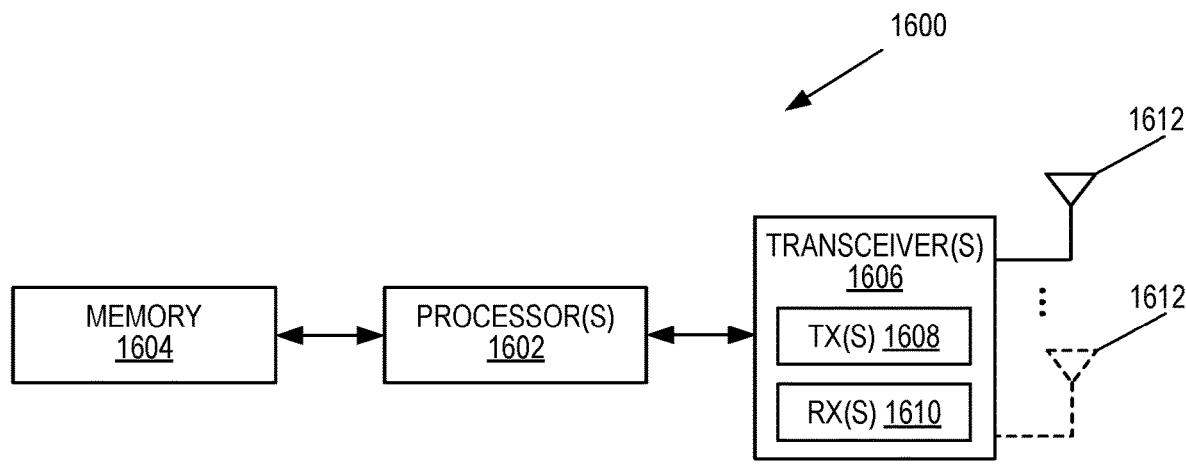
FIG. 16 is a schematic block diagram of a User Equipment (UE) according to some embodiments of the present disclosure.

FIG. 16 is a schematic block diagram of a UE 1600 according to some embodiments of the present disclosure. As illustrated, the UE 1600 includes one or more processors 1602 (e.g., CPUs, ASICs, FPGAs, and/or the like), memory 1604, and one or more transceivers 1606 each including one or more transmitters 1608 and one or more receivers 1610 coupled to one or more antennas 1612. The transceiver(s) 1606 includes radio-front end circuitry connected to the antenna(s) 1612 that is configured to condition signals communicated between the antenna(s) 1612 and the processor(s) 1602, as will be appreciated by on of ordinary skill in the art. The processors 1602 are also referred to herein as processing circuitry. The transceivers 1606 are also referred to herein as radio circuitry. In some embodiments, the functionality of the UE 1600 described above may be fully or partially implemented in software that is, e.g., stored in the memory 1604 and executed by the processor(s) 1602. Note that the UE 1600 may include additional components not illustrated in FIG. 16 such as, e.g., one or more user interface components (e.g., an input/output interface including a display, buttons, a touch screen, a microphone, a speaker(s), and/or the like and/or any other components for allowing input of information into the UE 1600 and/or allowing output of information from the UE 1600), a power supply (e.g., a battery and associated power circuitry), etc.

In some embodiments, a computer program including instructions which, when executed by at least one processor, causes the at least one processor to carry out the functionality of the UE 1600 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 17:
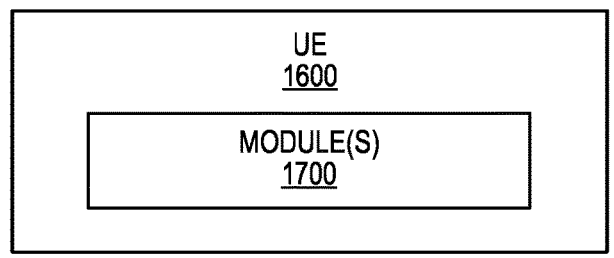
FIG. 17 is a schematic block diagram of the UE according to some other embodiments of the present disclosure.

FIG. 17 is a schematic block diagram of the UE 1600 according to some other embodiments of the present disclosure. The UE 1600 includes one or more modules 1700, each of which is implemented in software. The module(s) 1700 provide the functionality of the UE 1600 described herein.

Figure 18:
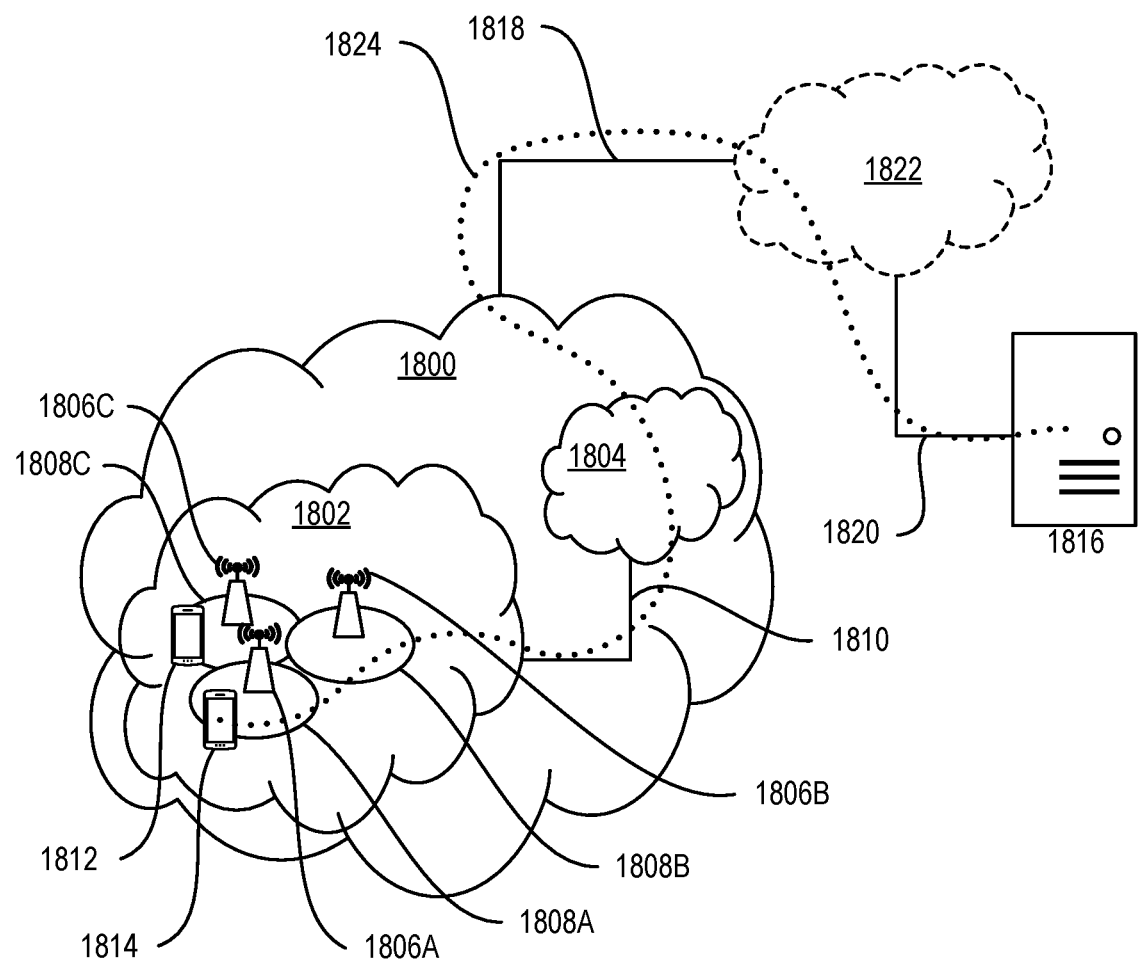
FIG. 18 illustrates a communication system including a telecommunication network, such as a Third Generation Partnership Project (3GPP)-type cellular network according to some embodiments of the present disclosure.

With reference to FIG. 18, in accordance with an embodiment, a communication system includes a telecommunication network 1800, such as a 3GPP-type cellular network, which comprises an access network 1802, such as a RAN, and a core network 1804. The access network 1802 comprises a plurality of base stations 1806A, 1806B, 1806C, such as NBs, eNBs, gNBs, or other types of wireless Access Points (APs), each defining a corresponding coverage area 1808A, 1808B, 1808C. Each base station 1806A, 1806B, 1806C is connectable to the core network 1804 over a wired or wireless connection 1810. A first UE 1812 located in coverage area 1808C is configured to wirelessly connect to, or be paged by, the corresponding base station 1806C. A second UE 1814 in coverage area 1808A is wirelessly connectable to the corresponding base station 1806A. While a plurality of UEs 1812, 1814 are illustrated in this example, the disclosed embodiments are equally applicable to a situation where a sole UE is in the coverage area or where a sole UE is connecting to the corresponding base station 1806.

The telecommunication network 1800 is itself connected to a host computer 1816, which may be embodied in the hardware and/or software of a standalone server, a cloud-implemented server, a distributed server, or as processing resources in a server farm. The host computer 1816 may be under the ownership or control of a service provider, or may be operated by the service provider or on behalf of the service provider. Connections 1818 and 1820 between the telecommunication network 1800 and the host computer 1816 may extend directly from the core network 1804 to the host computer 1816 or may go via an optional intermediate network 1822. The intermediate network 1822 may be one of, or a combination of more than one of, a public, private, or hosted network; the intermediate network 1822, if any, may be a backbone network or the Internet; in particular, the intermediate network 1822 may comprise two or more sub-networks (not shown).

The communication system of FIG. 18 as a whole enables connectivity between the connected UEs 1812, 1814 and the host computer 1816. The connectivity may be described as an Over-the-Top (OTT) connection 1824. The host computer 1816 and the connected UEs 1812, 1814 are configured to communicate data and/or signaling via the OTT connection 1824, using the access network 1802, the core network 1804, any intermediate network 1822, and possible further infrastructure (not shown) as intermediaries. The OTT connection 1824 may be transparent in the sense that the participating communication devices through which the OTT connection 1824 passes are unaware of routing of uplink and downlink communications. For example, the base station 1806 may not or need not be informed about the past routing of an incoming downlink communication with data originating from the host computer 1816 to be forwarded (e.g., handed over) to a connected UE 1812. Similarly, the base station 1806 need not be aware of the future routing of an outgoing uplink communication originating from the UE 1812 towards the host computer 1816.

Example implementations, in accordance with an embodiment, of the UE, base station, and host computer discussed in the preceding paragraphs will now be described with reference to FIG. 19. In a communication system 1900, a host computer 1902 comprises hardware 1904 including a communication interface 1906 configured to set up and maintain a wired or wireless connection with an interface of a different communication device of the communication system 1900. The host computer 1902 further comprises processing circuitry 1908, which may have storage and/or processing capabilities. In particular, the processing circuitry 1908 may comprise one or more programmable processors, ASICs, FPGAs, or combinations of these (not shown) adapted to execute instructions. The host computer 1902 further comprises software 1910, which is stored in or accessible by the host computer 1902 and executable by the processing circuitry 1908. The software 1910 includes a host application 1912. The host application 1912 may be operable to provide a service to a remote user, such as a UE 1914 connecting via an OTT connection 1916 terminating at the UE 1914 and the host computer 1902. In providing the service to the remote user, the host application 1912 may provide user data which is transmitted using the OTT connection 1916.

The communication system 1900 further includes a base station 1918 provided in a telecommunication system and comprising hardware 1920 enabling it to communicate with the host computer 1902 and with the UE 1914. The hardware 1920 may include a communication interface 1922 for setting up and maintaining a wired or wireless connection with an interface of a different communication device of the communication system 1900, as well as a radio interface 1924 for setting up and maintaining at least a wireless connection 1926 with the UE 1914 located in a coverage area (not shown in FIG. 19) served by the base station 1918. The communication interface 1922 may be configured to facilitate a connection 1928 to the host computer 1902. The connection 1928 may be direct or it may pass through a core network (not shown in FIG. 19) of the telecommunication system and/or through one or more intermediate networks outside the telecommunication system. In the embodiment shown, the hardware 1920 of the base station 1918 further includes processing circuitry 1930, which may comprise one or more programmable processors, ASICs, FPGAs, or combinations of these (not shown) adapted to execute instructions. The base station 1918 further has software 1932 stored internally or accessible via an external connection.

The communication system 1900 further includes the UE 1914 already referred to. The UE's 1914 hardware 1934 may include a radio interface 1936 configured to set up and maintain a wireless connection 1926 with a base station serving a coverage area in which the UE 1914 is currently located. The hardware 1934 of the UE 1914 further includes processing circuitry 1938, which may comprise one or more programmable processors, ASICs, FPGAs, or combinations of these (not shown) adapted to execute instructions. The UE 1914 further comprises software 1940, which is stored in or accessible by the UE 1914 and executable by the processing circuitry 1938. The software 1940 includes a client application 1942. The client application 1942 may be operable to provide a service to a human or non-human user via the UE 1914, with the support of the host computer 1902. In the host computer 1902, the executing host application 1912 may communicate with the executing client application 1942 via the OTT connection 1916 terminating at the UE 1914 and the host computer 1902. In providing the service to the user, the client application 1942 may receive request data from the host application 1912 and provide user data in response to the request data. The OTT connection 1916 may transfer both the request data and the user data. The client application 1942 may interact with the user to generate the user data that it provides.

Figure 19:
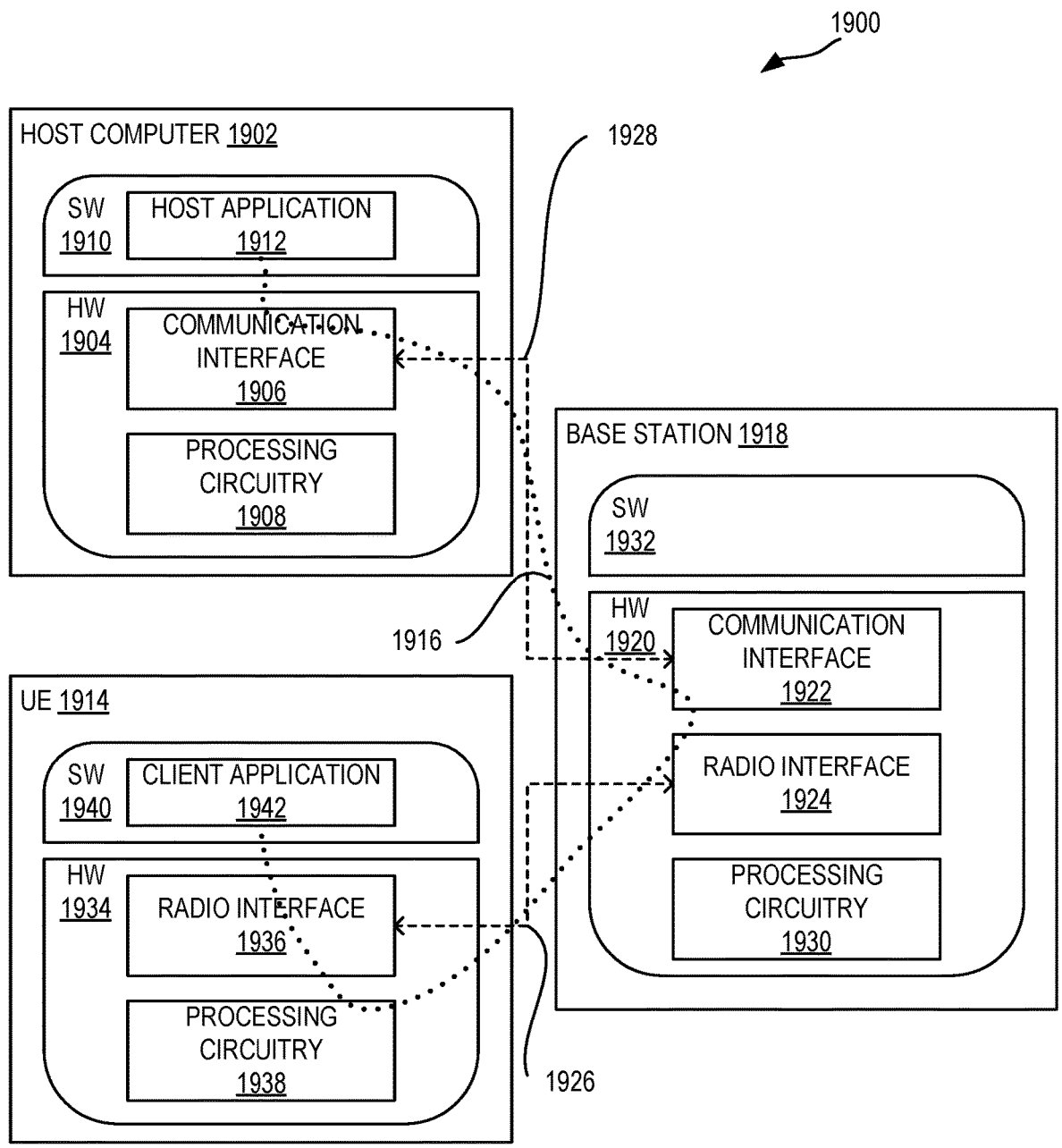
FIG. 19 illustrates a communication system including a host computer, according to some embodiments of the present disclosure.

It is noted that the host computer 1902, the base station 1918, and the UE 1914 illustrated in FIG. 19 may be similar or identical to the host computer 1816, one of the base stations 1806A, 1806B, 1806C, and one of the UEs 1812, 1814 of FIG. 18, respectively. This is to say, the inner workings of these entities may be as shown in FIG. 19 and independently, the surrounding network topology may be that of FIG. 18.

In FIG. 19, the OTT connection 1916 has been drawn abstractly to illustrate the communication between the host computer 1902 and the UE 1914 via the base station 1918 without explicit reference to any intermediary devices and the precise routing of messages via these devices. The network infrastructure may determine the routing, which may be configured to hide from the UE 1914 or from the service provider operating the host computer 1902, or both.

While the OTT connection 1916 is active, the network infrastructure may further take decisions by which it dynamically changes the routing (e.g., on the basis of load balancing consideration or reconfiguration of the network).

The wireless connection 1926 between the UE 1914 and the base station 1918 is in accordance with the teachings of the embodiments described throughout this disclosure. One or more of the various embodiments improve the performance of OTT services provided to the UE 1914 using the OTT connection 1916, in which the wireless connection 1926 forms the last segment. More precisely, the teachings of these embodiments may improve the e.g., data rate, latency, power consumption, etc. and thereby provide benefits such as e.g., reduced user waiting time, relaxed restriction on file size, better responsiveness, extended battery lifetime, etc.

A measurement procedure may be provided for the purpose of monitoring data rate, latency, and other factors on which the one or more embodiments improve. There may further be an optional network functionality for reconfiguring the OTT connection 1916 between the host computer 1902 and the UE 1914, in response to variations in the measurement results. The measurement procedure and/or the network functionality for reconfiguring the OTT connection 1916 may be implemented in the software 1910 and the hardware 1904 of the host computer 1902 or in the software 1940 and the hardware 1934 of the UE 1914, or both. In some embodiments, sensors (not shown) may be deployed in or in association with communication devices through which the OTT connection 1916 passes; the sensors may participate in the measurement procedure by supplying values of the monitored quantities exemplified above, or supplying values of other physical quantities from which the software 1910, 1940 may compute or estimate the monitored quantities. The reconfiguring of the OTT connection 1916 may include message format, retransmission settings, preferred routing, etc.; the reconfiguring need not affect the base station 1918, and it may be unknown or imperceptible to the base station 1918. Such procedures and functionalities may be known and practiced in the art. In certain embodiments, measurements may involve proprietary UE signaling facilitating the host computer 1902's measurements of throughput, propagation times, latency, and the like. The measurements may be implemented in that the software 1910 and 1940 causes messages to be transmitted, in particular empty or 'dummy' messages, using the OTT connection 1916 while it monitors propagation times, errors, etc.

Figures 20, 21:
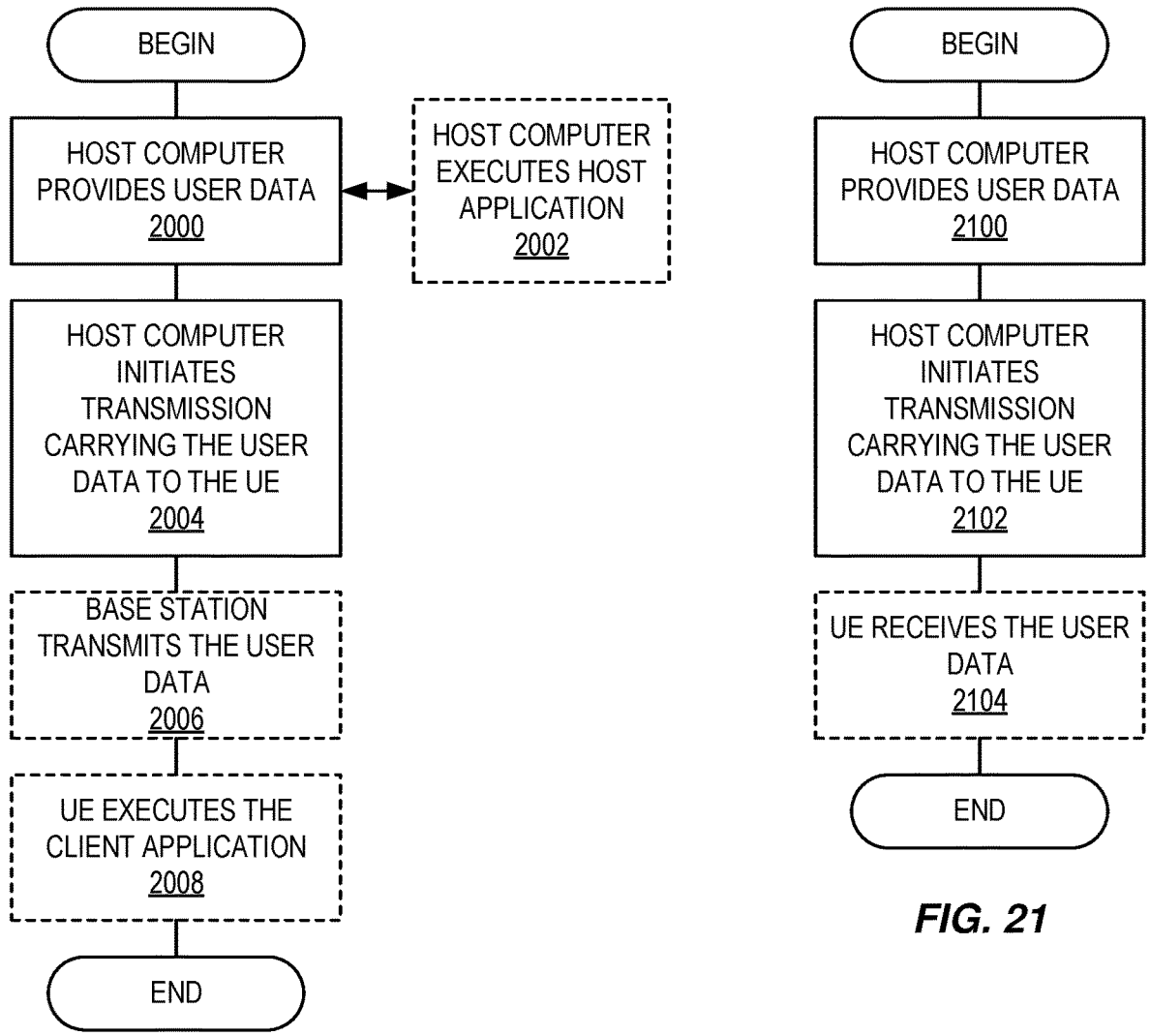

FIG. 20 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 20 will be included in this section. In step 2000, the host computer provides user data. In sub-step 2002 (which may be optional) of step 2000, the host computer provides the user data by executing a host application. In step 2004, the host computer initiates a transmission carrying the user data to the UE. In step 2006 (which may be optional), the base station transmits to the UE the user data which was carried in the transmission that the host computer initiated, in accordance with the teachings of the embodiments described throughout this disclosure. In step 2008 (which may also be optional), the UE executes a client application associated with the host application executed by the host computer.

FIG. 21 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 21 will be included in this section. In step 2100 of the method, the host computer provides user data. In an optional sub-step (not shown) the host computer provides the user data by executing a host application. In step 2102, the host computer initiates a transmission carrying the user data to the UE. The transmission may pass via the base station, in accordance with the teachings of the embodiments described throughout this disclosure. In step 2104 (which may be optional), the UE receives the user data carried in the transmission.

FIG. 22 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 22 will be included in this section. In step 2200 (which may be optional), the UE receives input data provided by the host computer. Additionally or alternatively, in step 2202, the UE provides user data. In sub-step 2204 (which may be optional) of step 2200, the UE provides the user data by executing a client application. In sub-step 2206 (which may be optional) of step 2202, the UE executes a client application which provides the user data in reaction to the received input data provided by the host computer. In providing the user data, the executed client application may further consider user input received from the user. Regardless of the specific manner in which the user data was provided, the UE initiates, in sub-step 2208 (which may be optional), transmission of the user data to the host computer. In step 2210 of the method, the host computer receives the user data transmitted from the UE, in accordance with the teachings of the embodiments described throughout this disclosure.

FIG. 23 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 23 will be included in this section. In step 2300 (which may be optional), in accordance with the teachings of the embodiments described throughout this disclosure, the base station receives user data from the UE. In step 2302 (which may be optional), the base station initiates transmission of the received user data to the host computer. In step 2304 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Group A Embodiments

1. A method performed by a wireless device for conveying external time domain information, the method comprising:
   receiving a message in a first time domain used by the wireless device, the message comprising external time domain information;
   determining information about a second time domain based on the external time domain information; and
   conveying information about the second time domain to another node.
2. The method of any of the previous embodiments wherein the first time domain is a 5G time domain.
3. The method of any of the previous embodiments wherein the second time domain is a Time-Sensitive Networking, TSN, time domain.
4. The method of any of the previous embodiments wherein conveying information about the second time domain to another node comprises conveying information about the second time domain to an end station in the TSN time domain.
5. The method of any of the previous embodiments wherein the message comprises a GPRS Tunneling Protocol, GTP, payload.
6. The method of any of the previous embodiments wherein conveying information about the second time domain to another node comprises conveying information about the second time domain to a translator/adaptor node that can interface between the first time domain and the second time domain.
7. The method of any of the previous embodiments further comprising: determining that the received message includes external time domain information by inspecting a field in the received message.
8. The method of the previous embodiment wherein inspecting a field in the received message comprises inspecting an EtherType field in the received message.
9. The method of any of the previous embodiments further comprising: receiving a message in the first time domain used by the wireless device, the message comprising external time domain information for at least a third time domain.
10. The method of any of the previous embodiments, further comprising:
    providing user data; and
    forwarding the user data to a host computer via the transmission to the base station.

Group B Embodiments

11. A method performed by a node for conveying external time domain information, the method comprising:
    receiving a message in a second time domain based on the external time domain information;
    determining external time domain information about the second time domain; and
    conveying information about the second time domain to another node in a first time domain used by the node, the message comprising the external time domain information.
12. The method of any of the previous embodiments wherein the first time domain is a 5G time domain.
13. The method of any of the previous embodiments wherein the second time domain is a Time-Sensitive Networking, TSN, time domain.
14. The method of any of the previous embodiments wherein conveying information about the second time domain to another node comprises conveying information about the second time domain to a wireless device in the first time domain to, perhaps, provide to an end station in the TSN time domain.
15. The method of any of the previous embodiments wherein conveying information about the second time domain to the another node comprises conveying a GPRS Tunneling Protocol, GTP, payload.
16. The method of any of the previous embodiments wherein receiving a message in a second time domain based on the external time domain information comprises receiving information about the second time domain from a translator/adaptor node that can interface between the first time domain and the second time domain.
17. The method of any of the previous embodiments further comprising: indicating that the conveyed information includes external time domain information by setting a field in the conveyed information.
18. The method of the previous embodiment wherein setting a field in the conveyed information comprises setting an EtherType field in the conveyed information.
19. The method of any of the previous embodiments further comprising: receiving a message in the second time domain based on external time domain information for at least a third time domain.
20. The method of any of the previous embodiments, further comprising:
    obtaining user data; and
    forwarding the user data to a host computer or a wireless device.

Group C Embodiments

21. A wireless device for conveying external time domain information, the wireless device comprising:
    processing circuitry configured to perform any of the steps of any of the Group A embodiments; and
    power supply circuitry configured to supply power to the wireless device.
22. A node for conveying external time domain information, the node comprising:
    processing circuitry configured to perform any of the steps of any of the Group B embodiments; and
    power supply circuitry configured to supply power to the node.
23. A User Equipment, UE, for conveying external time domain information, the UE comprising:
    an antenna configured to send and receive wireless signals;
    radio front-end circuitry connected to the antenna and to processing circuitry, and configured to condition signals communicated between the antenna and the processing circuitry;

the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

24. A communication system including a host computer comprising:
processing circuitry configured to provide user data; and
a communication interface configured to forward the user data to a cellular network for transmission to a User Equipment, UE;
wherein the cellular network comprises a node having a radio interface and processing circuitry, the node's processing circuitry configured to perform any of the steps of any of the Group B embodiments.

25. The communication system of the previous embodiment further including the node.

26. The communication system of the previous 2 embodiments, further including the UE, wherein the UE is configured to communicate with the node.

27. The communication system of the previous 3 embodiments, wherein:
the processing circuitry of the host computer is configured to execute a host application, thereby providing the user data; and
the UE comprises processing circuitry configured to execute a client application associated with the host application.

28. A method implemented in a communication system including a host computer, a node, and a User Equipment, UE, the method comprising:
at the host computer, providing user data; and
at the host computer, initiating a transmission carrying the user data to the UE via a cellular network comprising the node, wherein the node performs any of the steps of any of the Group B embodiments.

29. The method of the previous embodiment, further comprising, at the node, transmitting the user data.

30. The method of the previous 2 embodiments, wherein the user data is provided at the host computer by executing a host application, the method further comprising, at the UE, executing a client application associated with the host application.

31. A User Equipment, UE, configured to communicate with a node, the UE comprising a radio interface and processing circuitry configured to perform the method of the previous 3 embodiments.

32. A communication system including a host computer comprising:
processing circuitry configured to provide user data; and
a communication interface configured to forward user data to a cellular network for transmission to a User Equipment, UE;
wherein the UE comprises a radio interface and processing circuitry, the UE's components configured to perform any of the steps of any of the Group A embodiments.

33. The communication system of the previous embodiment, wherein the cellular network further includes a node configured to communicate with the UE.

34. The communication system of the previous 2 embodiments, wherein:

the processing circuitry of the host computer is configured to execute a host application, thereby providing the user data; and
the UE's processing circuitry is configured to execute a client application associated with the host application.

35. A method implemented in a communication system including a host computer, a node, and a User Equipment, UE, the method comprising:
at the host computer, providing user data; and
at the host computer, initiating a transmission carrying the user data to the UE via a cellular network comprising the node, wherein the UE performs any of the steps of any of the Group A embodiments.

36. The method of the previous embodiment, further comprising at the UE, receiving the user data from the node.

37. A communication system including a host computer comprising:
communication interface configured to receive user data originating from a transmission from a User Equipment, UE, to a node;
wherein the UE comprises a radio interface and processing circuitry, the UE's processing circuitry configured to perform any of the steps of any of the Group A embodiments.

38. The communication system of the previous embodiment, further including the UE.

39. The communication system of the previous 2 embodiments, further including the node, wherein the node comprises a radio interface configured to communicate with the UE and a communication interface configured to forward to the host computer the user data carried by a transmission from the UE to the node.

40. The communication system of the previous 3 embodiments, wherein:
the processing circuitry of the host computer is configured to execute a host application; and
the UE's processing circuitry is configured to execute a client application associated with the host application, thereby providing the user data.

41. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

42. A method implemented in a communication system including a host computer, a node, and a User Equipment, UE, the method comprising:
at the host computer, receiving user data transmitted to the node from the UE, wherein the UE performs any of the steps of any of the Group A embodiments.

43. The method of the previous embodiment, further comprising, at the UE, providing the user data to the node.

44. The method of the previous 2 embodiments, further comprising:
at the UE, executing a client application, thereby providing the user data to be transmitted; and
at the host computer, executing a host application associated with the client application.

45. The method of the previous 3 embodiments, further comprising:
at the UE, executing a client application; and at the UE, receiving input data to the client application, the input data being provided at the host computer by executing a host application associated with the client application;

wherein the user data to be transmitted is provided by the client application in response to the input data.

46. A communication system including a host computer comprising a communication interface configured to receive user data originating from a transmission from a User Equipment, UE, to a node, wherein the node comprises a radio interface and processing circuitry, the node's processing circuitry configured to perform any of the steps of any of the Group B embodiments.

47. The communication system of the previous embodiment further including the node.

48. The communication system of the previous 2 embodiments, further including the UE, wherein the UE is configured to communicate with the node.

49. The communication system of the previous 3 embodiments, wherein:

the processing circuitry of the host computer is configured to execute a host application; and the UE is configured to execute a client application associated with the host application, thereby providing the user data to be received by the host computer.

50. A method implemented in a communication system including a host computer, a node, and a User Equipment, UE, the method comprising:

at the host computer, receiving, from the node, user data originating from a transmission which the node has received from the UE, wherein the UE performs any of the steps of any of the Group A embodiments.

51. The method of the previous embodiment, further comprising at the node, receiving the user data from the UE.

52. The method of the previous 2 embodiments, further comprising at the node, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
AF Application Function
AMF Access and Mobility Management Function
AN Access Network
AP Access Point
ASIC Application Specific Integrated Circuit
AUSF Authentication Server Function
BMCA Best Master Clock Algorithm
BSC Base Station Controller
BTS Base Transceiver Station
CPU Central Processing Unit
DN Data Network
DSP Digital Signal Processor
E2E End to End
eNB Enhanced or Evolved Node B
FPGA Field Programmable Gate Array
GHz Gigahertz
GM Grand Master
gNB New Radio Base Station
gPTP New Radio Precision Time Protocol
GTP General Packet Radio Service Tunneling Protocol
GTP-U General Packet Radio Service Tunneling Protocol for User Plane
IEEE Institute of Electrical and Electronics Engineers
IP Internet Protocol
LTE Long Term Evolution
MAC Medium Access Control
MME Mobility Management Entity
ms millisecond
MTC Machine Type Communication
NEF Network Exposure Function
NF Network Function
NR New Radio
NRF Network Function Repository Function
NSSF Network Slice Selection Function
OTT Over-the-Top
PCF Policy Control Function
PDCP Packet Data Convergence Protocol
PDU Packet Data Unit
P-GW Packet Data Network Gateway
PTP Precision Time Protocol
QoS Quality of Service
RAM Random Access Memory
RAN Radio Access Network
RAT Radio Access Technology
RNC Radio Network Controller
ROM Read Only Memory
RRC Radio Resource Control
RRH Remote Radio Head
RRU Remote Radio Unit
RTT Round Trip Time
SCEF Service Capability Exposure Function
SIB System Information Block
SMF Session Management Function
SOOC Slave Only Ordinary Clock
TP Transport Network Function
TR Technical Report
TSN Time-Sensitive Networking
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

What is claimed is:

1. A method performed by a wireless device in a telecommunication system connected to an external (g)PTP domain for conveying external time domain information, the method comprising:

receiving, from a network translator in the telecommunication system, a Precision Time Protocol, (g)PTP, message originated by the external (g)PTP domain, the (g)PTP message comprises a (g)PTP suffix and a correction field value; where the (g)PTP suffix and the correction field value are modified by the network translator in the telecommunication system;

determining a timestamp delta that indicates a difference between a first timestamp provided in the (g)PTP suffix and a second timestamp provided by the wireless device;

updating the correction field value to include the determined timestamp delta; and conveying the updated correction field value to an end station.

2. The method of claim 1 wherein the external time domain is a Time-Sensitive Networking, TSN, time domain.

3. The method of claim 1 wherein receiving the (g)PTP message comprises receiving the (g)PTP message from a translator node associated with a User Plane Function, UPF, node.

4. The method of claim 3 wherein the translator node is associated with a New Radio Base Station, gNB.

5. The method of claim 1 wherein conveying the updated correction field value to an end station comprises sending to the end station a (g)PTP message conveying the updated correction field value.

6. The method of claim 1 wherein the wireless device either comprises the end station or is separate from the end station.

7. The method of claim 1 wherein the (g)PTP message is at least one of a (g)PTP Synchronization message or (g)PTP Follow-Up message.

8. The method of claim 1 further comprising receiving a (g)PTP message comprising external time domain information for at least a second external time domain.

9. A method performed by a node in a telecommunication system for conveying external time domain information, the method comprising:
 receiving from a Time-Sensitive Networking, TSN, time domain a Precision Time Protocol, (g)PTP, message including external time domain information;
 determining a timestamp at which the (g)PTP message is received at the node;
 updating the external time domain information to include the determined information; and
 transmitting the (g)PTP message comprising updated external time domain information where the updated external time domain information comprises one of a group of information elements consisting of:
 a (g)PTP suffix; and
 a correction field value.

10. The method of claim 9 wherein the external time domain is a Time-Sensitive Networking, TSN, time domain.

11. The method of claim 9 wherein receiving the (g)PTP message comprises receiving the (g)PTP message from a Time-Sensitive Networking, TSN, bridge.

12. The method of claim 9 wherein the translator node is associated with either a User Plane Function, UPF, node or a New Radio Base Station, gNB.

13. The method of claim 9 wherein the external time domain information comprises the (g)PTP suffix and sending the updated external time domain information comprises sending a (g)PTP message that includes the (g)PTP suffix.

14. The method of claim 9 wherein transmitting the (g)PTP message comprising the updated external time domain information comprises transmitting the (g)PTP message comprising the updated external time domain information to a wireless device.

15. The method of claim 14 wherein the wireless device either comprises an end station or is separate from the end station.

* * * * *

UNITED STATES PATENT AND TRADEMARK OFFICE
CERTIFICATE OF CORRECTION

PATENT NO. : 11,695,491 B2
APPLICATION NO. : 17/841130
DATED : July 4, 2023
INVENTOR(S) : Wang et al.

Page 1 of 1

It is certified that error appears in the above-identified patent and that said Letters Patent is hereby corrected as shown below:

In the Specification

In Column 5, Line 26, delete "Network" and insert -- Network Function --, therefor.

In Column 6, Line 57, delete "SMP," and insert -- SMF, --, therefor.

In Column 10, Line 4, delete "Ethertype" and insert -- EtherType --, therefor.

In Column 10, Line 38, delete "(500C)" and insert -- (SOOC) --, therefor.

In Column 12, Line 12, delete "under layer" and insert -- underlying --, therefor.

In Column 12, Line 20, delete "transport" and insert -- transport network --, therefor.

In Column 18, Line 32, delete "sub-step" and insert -- step --, therefor.

Signed and Sealed this
Eighth Day of October, 2024

Katherine Kelly Vidal
*Director of the United States Patent and Trademark Office*